US012689619B2

(12) United States Patent
Lohmar et al.

(10) Patent No.: US 12,689,619 B2
(45) Date of Patent: Jul. 21, 2026

(54) PER-APPLICATION AUTHENTICATION AND/OR AUTHORIZATION

(71) Applicant: Telefonaktiebolaget LM Ericsson (publ), Stockholm (SE)

(72) Inventors: Thorsten Lohmar, Aachen (DE); Patrik Teppo, Bobäck (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 185 days.

(21) Appl. No.: 18/832,233

(22) PCT Filed: Dec. 21, 2022

(86) PCT No.: PCT/EP2022/087244
§ 371 (c)(1),
(2) Date: Jul. 23, 2024

(87) PCT Pub. No.: WO2023/143836
PCT Pub. Date: Aug. 3, 2023

(65) Prior Publication Data
US 2025/0106197 A1     Mar. 27, 2025

Related U.S. Application Data

(60) Provisional application No. 63/305,041, filed on Jan. 31, 2022.

(51) Int. Cl.
*H04L 9/40*       (2022.01)
*H04L 65/1063*    (2022.01)
*H04L 65/80*      (2022.01)

(52) U.S. Cl.
CPC .......... *H04L 63/0807* (2013.01); *H04L 63/20* (2013.01); *H04L 65/1063* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 11,750,676 B2 * | 9/2023 | Sodagar | H04L 65/80 709/231 |
| 11,902,337 B2 * | 2/2024 | Sodagar | H04N 21/6338 |

(Continued)

OTHER PUBLICATIONS

"[FS_5GMS_EXT]: Per App authorization", 3GPP TSG-S4 Meeting #117e, S4-220148, Electronic Meeting, Feb. 17-23, 2022, pp. 1-8.

(Continued)

*Primary Examiner* — Jeffrey R Swearingen
(74) *Attorney, Agent, or Firm* — Murphy, Bilak & Homiller, PLLC

(57)          ABSTRACT

The application relates to method for a 5G Media Streaming, 5GMS, Aware Application, AA, hosted by a user equipment, UE, operating in a communication network, the method comprising the step of obtaining, from an application service provider, ASP, associated with the 5GMS AA, a token indicating that the 5GMS AA is authorized to invoke or activate a dynamic policy for resources of the communication network, wherein the dynamic policy is associated with the ASP; and the step of sending the token to a 5GMS client hosted by the UE, wherein the 5GMS client is associated with a 5GMS application function, AF, of the communication network.

26 Claims, 15 Drawing Sheets

(56) References Cited

U.S. PATENT DOCUMENTS

| | | | |
|---|---|---|---|
| 12,388,879 B2 * | 8/2025 | Sodagar | H04N 21/6338 |
| 2025/0024315 A1 * | 1/2025 | Kolan | H04W 48/18 |

OTHER PUBLICATIONS

"3GPP TR 26.804 V1.0.0", 3rd Generation Partnership Project; Technical Specification Group Services and System Aspects; Study on 5G media streaming extensions (Release 17), Dec. 2021, pp. 1-106.

"3GPP TR 26.939 V17.0.0", 3rd Generation Partnership Project; Technical Specification Group Services and System Aspects; Guidelines on the Framework for Live Uplink Streaming (FLUS); (Release 17), Sep. 2021, pp. 1-87.

"3GPP TS 26.234 V15.1.0", 3rd Generation Partnership Project; Technical Specification Group Services and System Aspects; Transparent end-to-end Packet-switched Streaming Service (PSS); Protocols and codecs (Release 15), Sep. 2018, pp. 1-174.

"3GPP TS 26.238 V17.0.0", 3rd Generation Partnership Project; Technical Specification Group Services and System Aspects; Uplink Streaming (Release 17), Dec. 2021, pp. 1-52.

"3GPP TS 26.501 V16.8.0", 3rd Generation Partnership Project; Technical Specification Group Services and System Aspects; 5G Media Streaming (5GMS); General description and architecture (Release 16), Jun. 2021, pp. 1-79.

"ISO/IEC 23009-1", International Standard, Third Edition, Aug. 2019, pp. 1-236.

"Presentation of Specification/Report to TSG: TR 26.804, Version 1.0.0 titled, 'Study on 5G media streaming extensions'", 3GPP TSG SA#94-e, SP-211340, e-Meeting, Dec. 14-20, 2021, 1 page.

"Report of SA4 MBS SWG AH Telco (Mar. 18, 2021)", 3GPP TSG SA WG4#113-e meeting, Tdoc S4-210488, Apr. 6-14, 2021, pp. 1-9.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247 V16.5.0, Sep. 2021, pp. 1-140.

Pantos, R., et al., "HTTP Live Streaming", Independent Submission, Request for Comments: 8216, Category: Informational, ISSN: 2070-1721, Aug. 2017, pp. 1-60.

* cited by examiner

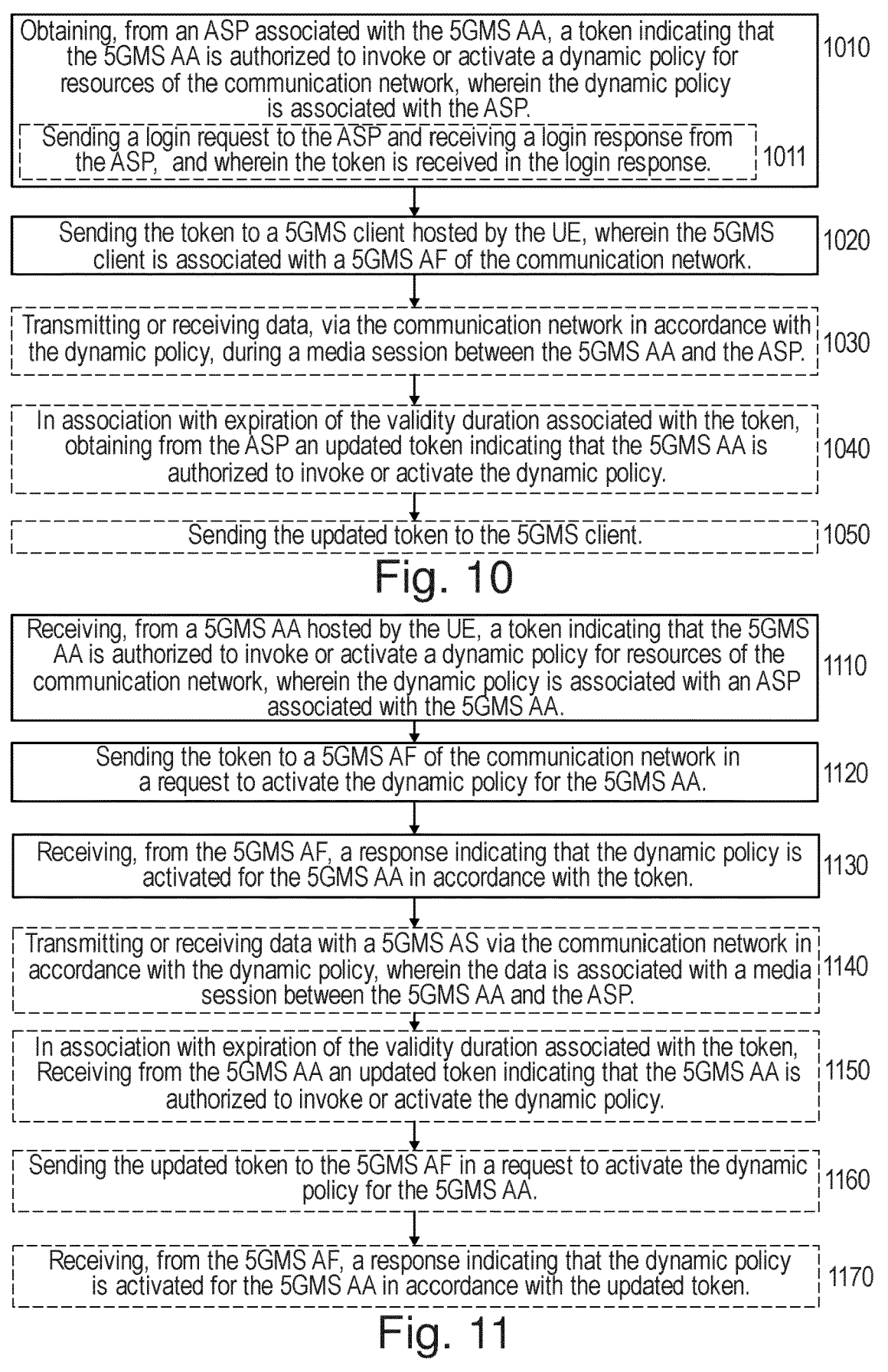

Obtaining, from an ASP associated with the 5GMS AA, a token indicating that the 5GMS AA is authorized to invoke or activate a dynamic policy for resources of the communication network, wherein the dynamic policy is associated with the ASP. — 1010

Sending a login request to the ASP and receiving a login response from the ASP, and wherein the token is received in the login response. — 1011

Sending the token to a 5GMS client hosted by the UE, wherein the 5GMS client is associated with a 5GMS AF of the communication network. — 1020

Transmitting or receiving data, via the communication network in accordance with the dynamic policy, during a media session between the 5GMS AA and the ASP. — 1030

In association with expiration of the validity duration associated with the token, obtaining from the ASP an updated token indicating that the 5GMS AA is authorized to invoke or activate the dynamic policy. — 1040

Sending the updated token to the 5GMS client. — 1050

Fig. 10

Receiving, from a 5GMS AA hosted by the UE, a token indicating that the 5GMS AA is authorized to invoke or activate a dynamic policy for resources of the communication network, wherein the dynamic policy is associated with an ASP associated with the 5GMS AA. — 1110

Sending the token to a 5GMS AF of the communication network in a request to activate the dynamic policy for the 5GMS AA. — 1120

Receiving, from the 5GMS AF, a response indicating that the dynamic policy is activated for the 5GMS AA in accordance with the token. — 1130

Transmitting or receiving data with a 5GMS AS via the communication network in accordance with the dynamic policy, wherein the data is associated with a media session between the 5GMS AA and the ASP. — 1140

In association with expiration of the validity duration associated with the token, Receiving from the 5GMS AA an updated token indicating that the 5GMS AA is authorized to invoke or activate the dynamic policy. — 1150

Sending the updated token to the 5GMS AF in a request to activate the dynamic policy for the 5GMS AA. — 1160

Receiving, from the 5GMS AF, a response indicating that the dynamic policy is activated for the 5GMS AA in accordance with the updated token. — 1170

Fig. 11

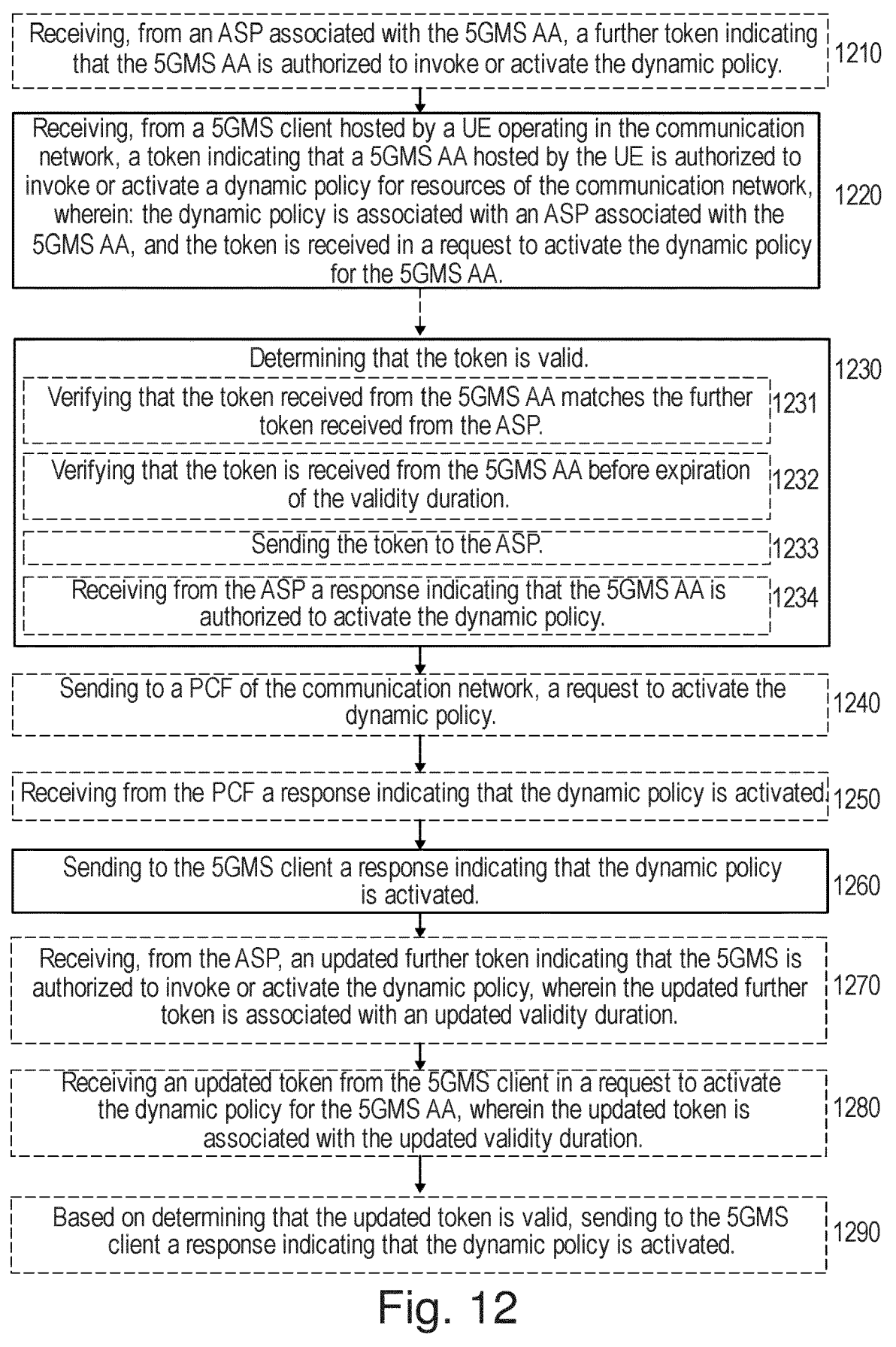

Receiving, from an ASP associated with the 5GMS AA, a further token indicating that the 5GMS AA is authorized to invoke or activate the dynamic policy. — 1210

Receiving, from a 5GMS client hosted by a UE operating in the communication network, a token indicating that a 5GMS AA hosted by the UE is authorized to invoke or activate a dynamic policy for resources of the communication network, wherein: the dynamic policy is associated with an ASP associated with the 5GMS AA, and the token is received in a request to activate the dynamic policy for the 5GMS AA. — 1220

Determining that the token is valid. — 1230

Verifying that the token received from the 5GMS AA matches the further token received from the ASP. — 1231

Verifying that the token is received from the 5GMS AA before expiration of the validity duration. — 1232

Sending the token to the ASP. — 1233

Receiving from the ASP a response indicating that the 5GMS AA is authorized to activate the dynamic policy. — 1234

Sending to a PCF of the communication network, a request to activate the dynamic policy. — 1240

Receiving from the PCF a response indicating that the dynamic policy is activated — 1250

Sending to the 5GMS client a response indicating that the dynamic policy is activated. — 1260

Receiving, from the ASP, an updated further token indicating that the 5GMS is authorized to invoke or activate the dynamic policy, wherein the updated further token is associated with an updated validity duration. — 1270

Receiving an updated token from the 5GMS client in a request to activate the dynamic policy for the 5GMS AA, wherein the updated token is associated with the updated validity duration. — 1280

Based on determining that the updated token is valid, sending to the 5GMS client a response indicating that the dynamic policy is activated. — 1290

Fig. 12

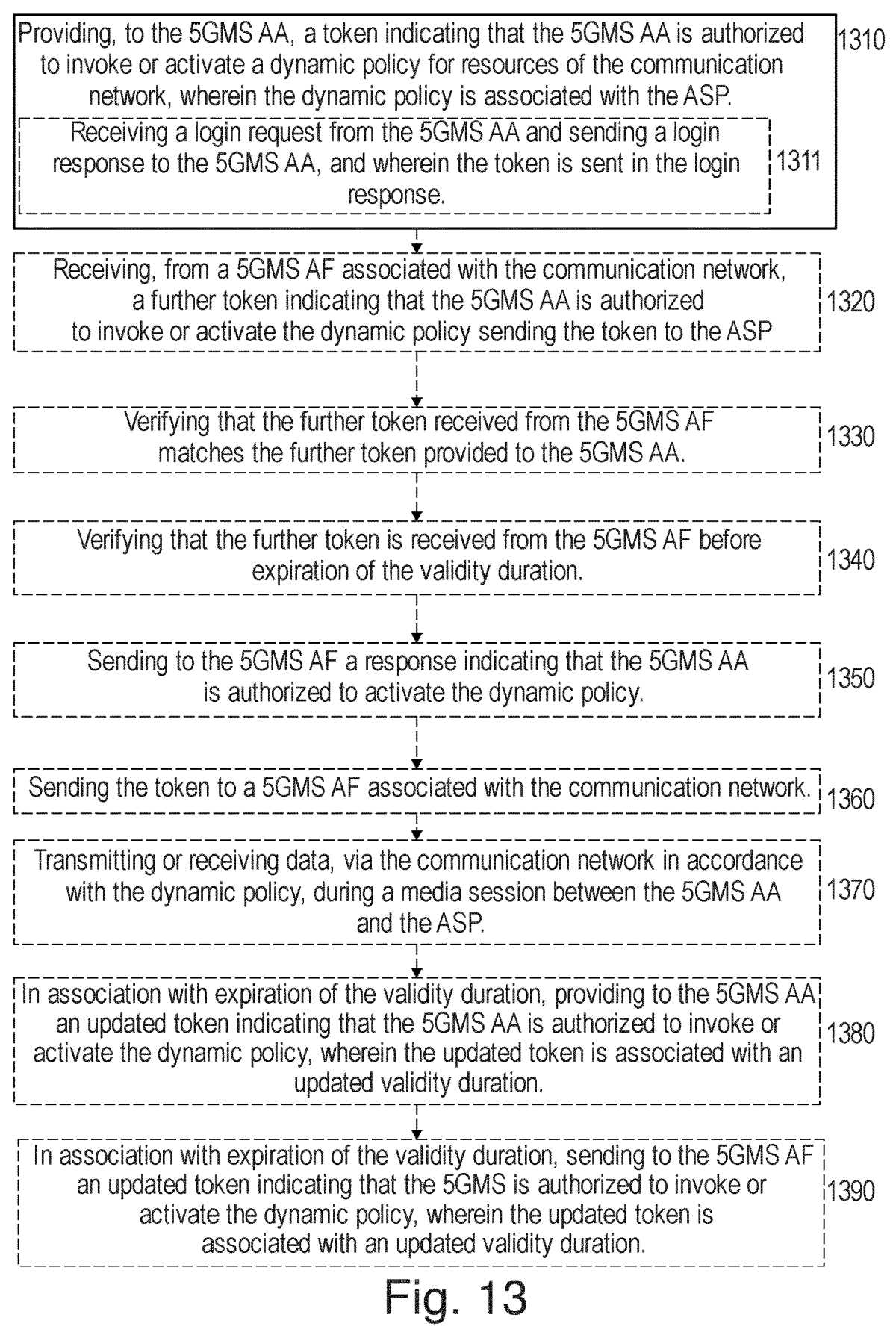

Providing, to the 5GMS AA, a token indicating that the 5GMS AA is authorized to invoke or activate a dynamic policy for resources of the communication network, wherein the dynamic policy is associated with the ASP. — 1310

Receiving a login request from the 5GMS AA and sending a login response to the 5GMS AA, and wherein the token is sent in the login response. — 1311

Receiving, from a 5GMS AF associated with the communication network, a further token indicating that the 5GMS AA is authorized to invoke or activate the dynamic policy sending the token to the ASP — 1320

Verifying that the further token received from the 5GMS AF matches the further token provided to the 5GMS AA. — 1330

Verifying that the further token is received from the 5GMS AF before expiration of the validity duration. — 1340

Sending to the 5GMS AF a response indicating that the 5GMS AA is authorized to activate the dynamic policy. — 1350

Sending the token to a 5GMS AF associated with the communication network. — 1360

Transmitting or receiving data, via the communication network in accordance with the dynamic policy, during a media session between the 5GMS AA and the ASP. — 1370

In association with expiration of the validity duration, providing to the 5GMS AA an updated token indicating that the 5GMS AA is authorized to invoke or activate the dynamic policy, wherein the updated token is associated with an updated validity duration. — 1380

In association with expiration of the validity duration, sending to the 5GMS AF an updated token indicating that the 5GMS is authorized to invoke or activate the dynamic policy, wherein the updated token is associated with an updated validity duration. — 1390

Fig. 13

COMMUNICATION
SYSTEM
1400

PER-APPLICATION AUTHENTICATION AND/OR AUTHORIZATION

TECHNICAL FIELD

The present application relates generally to the field of communication networks, and more specifically to techniques for authenticating and/or authorizing individual applications (e.g., hosted by user equipment, UEs) that want to use resources of a communication network. The application relates to a method carried out at a 5G Media Streaming Aware Application, 5GMS AA, to a method carried out at a 5G Media Streaming, 5GMS, client, to a method carried out at a 5GMS Application Function, 5GMS AF, and to a method carried out at an application service provider, ASP. Furthermore the corresponding entities are provided, a user equipment, UE, a non-transitory, computer readable storage medium and a computer program product

BACKGROUND

At a high level, the 5G System (5GS) comprising an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, comprising a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one or more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" with the term "AMF" described in more detail below.

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB- CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

OAUTH 2.0 is commonly used to provide security to HTTP REST APIs, such as used in the 5GC SBA. OAUTH separates the authorization server from the resource server. This often simplifies deployments, since not every resource server (e.g., HTTP server) needs to also provide authorization functionality. Further, separation of authorization server and resource server allows reusing access credentials for different services or between different parties.

The 5G Media Streaming Architecture was defined within 3GPP Release 16 (Rel-16) as an evolution of Packet Switched Streaming defined in 3GPP TS 26.234 (v15.1.0). The 5G Media Streaming (5GMS) Architecture focuses on content delivery using dynamic adaptive streaming over HTTP (DASH) or HTTP live stream (HLS). 5GMS also defines additional media control-related procedures leverage and/or utilize the 5G User Plane (UP). 5GMS supports both uplink (UL, i.e., UE to network) and downlink (DL, i.e., network to UE) streaming. Several functions are specific to either UL or DL (e.g., content hosting) but other functions (e.g., dynamic policy) are commonly used for both UL and DL streaming use-cases.

A 5GMS Application Provider uses the 5GMS functions to provide an application service, such as a video or audio streaming service. The 5GMS Application Provider controls (and provides) the 5GMS Aware Application (5GMS AA) on the UE, which is enabled to use the 5GMS functions. For example, the UE can include a 5GMS Client, which is a type of an application enabler client (e.g., an OS-level function) that supports the 5G MS defined protocols and procedures. The UE application client can access the 5GMS functionality via the 5GMS client.

SUMMARY

A dynamic policy (or dynamic policy invocation) procedure enables a UE application (i.e., associated with an application service provider) to activate a new 3GPP system policy, such as a quality of service (QoS) policy or a charging-related policy. Nevertheless, it is currently unclear how to determine whether a requesting UE application is authorized to activate a particular dynamic policy. For example, it is unclear how to determine whether the requesting UE application is attempting to reuse policies of another application service provider. This can cause various problems, issues, and/or difficulties.

Embodiments of the present disclosure address these and other problems, issues, and/or difficulties, thereby facilitating authentication and/or authorization of UE applications that attempt to invoke dynamic policies.

The problems mentioned above are solved by the features of the independent claims, Dependent claims describe further embodiments.

Some embodiments include exemplary methods (e.g., procedures) for a 5GMS AA hosted by a UE operating in a communication network (e.g., NG-RAN, 5GC).

These exemplary methods can include obtaining, from an application service provider (ASP) associated with the 5GMS AA, a token indicating that the 5GMS AA is authorized to invoke or activate a dynamic policy for resources of the communication network, wherein the dynamic policy is associated with the ASP. These exemplary methods can also include sending the token to a 5GMS client hosted by the UE. The 5GMS client is associated with a 5GMS application function (AF) of the communication network.

Other embodiments include methods (e.g., procedures) for a 5GMS client hosted by a UE operating in a communication network (e.g., NG-RAN, 5GC).

These exemplary methods can include receiving, from a 5GMS AA hosted by the UE, a token indicating that the 5GMS AA is authorized to invoke or activate a dynamic policy for resources of the communication network. The dynamic policy is associated with an ASP that is associated with the 5GMS AA. These exemplary methods can also include sending the token to a 5GMS AF of the communication network in a request to activate the dynamic policy for the 5GMS AA. These exemplary methods can also include receiving, from the 5GMS AF, a response indicating that the dynamic policy is activated for the 5GMS AA in accordance with the token.

Other embodiments include methods (e.g., procedures) for a 5GMS AF associated with a communication network (e.g., NG-RAN, 5GC).

These exemplary methods can include receiving, from a 5GMS client hosted by a UE operating in the communication network, a token indicating that a 5GMS AA hosted by the UE is authorized to invoke or activate a dynamic policy for resources of the communication network. The dynamic policy is associated with an ASP that is associated with the 5GMS AA, and the token is received in a request to activate the dynamic policy for the 5GMS AA. These exemplary methods can also include, based on determining that the token is valid, sending to the 5GMS client a response indicating that the dynamic policy is activated.

Other embodiments include methods (e.g., procedures) an ASP associated with a 5GMS AA hosted by a UE operating in a communication network (e.g., NG-RAN, 5GC).

These exemplary methods can include providing, to the 5GMS AA, a token indicating that the 5GMS AA is authorized to invoke or activate a dynamic policy for resources of the communication network, wherein the dynamic policy is associated with the ASP.

Other embodiments include 5GMS AAs, 5GMS clients, 5GMS AFs, and ASPs and UEs network nodes, or computing apparatus hosting the same that are configured to perform operations corresponding to any of the exemplary methods described herein. Other embodiments also include non-transitory, computer-readable media storing computer-executable instructions that, when executed by processing circuitry, configure such 5GMS AAs, 5GMS clients, 5GMS AFs, and ASPs to perform operations corresponding to any of the exemplary methods described herein.

These and other disclosed embodiments can facilitate authentication and/or authorization of UE applications that attempt to invoke dynamic policies related to usage of resources in a communication network, such as a QoS policy or a charging-related policy. Embodiments can facilitate compliance with service level agreements (SLAs) between an MNO and an ASP, such that the ASP authorizes application resource usage within bounds of the SLA and prevents resource usage outside of those bounds. For example, embodiments prevent other applications not covered by the SLA from using network resources paid for by the ASP. In this manner, embodiments provide improved control by the MNO and/or the ASP over network resource usage by applications.

These and other objects, features, and advantages of the present disclosure will become apparent upon reading the following Detailed Description in view of the Drawings briefly described below.

BRIEF DESCRIPTION OF THE DRAWINGS

FIG. 10 shows an exemplary method (e.g., procedure) for a 5GMS AA hosted by a UE operating in a communication network, according to various embodiments of the present disclosure.

FIG. 11 shows an exemplary method (e.g., procedure) for a 5GMS client hosted by a UE operating in a communication network, according to various embodiments of the present disclosure.

FIG. 12 shows an exemplary method (e.g., procedure) for a 5GMS AF associated with a communication network, according to various embodiments of the present disclosure.

<table>
<tr><td>5</td><td>6</td></tr>
</table>

FIG. 13 shows an exemplary method (e.g., procedure) for an ASP associated with a 5GMS AA hosted by a UE operating in a communication network, according to various embodiments of the present disclosure.

Figure 14:
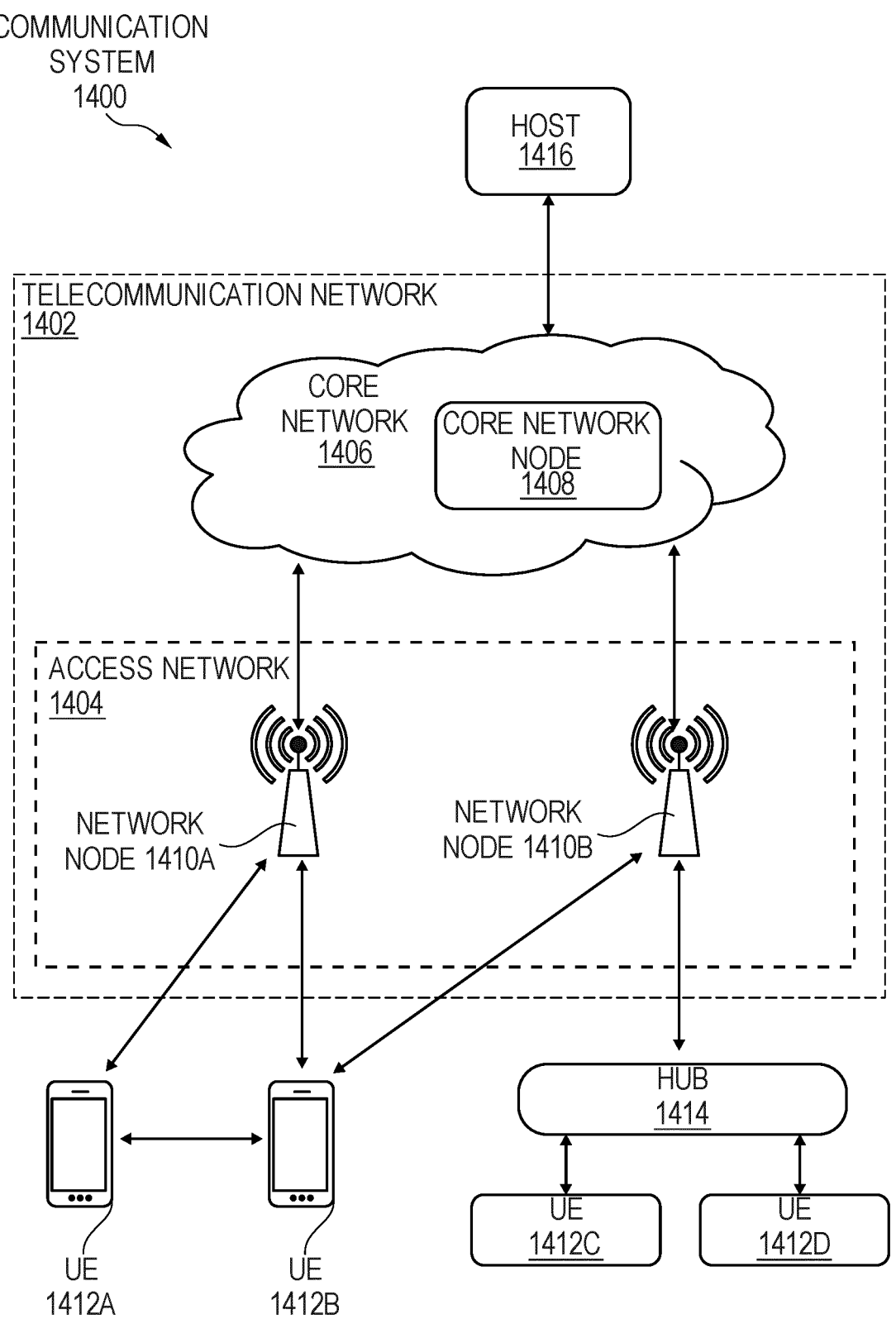

FIG. 14 shows a communication system according to various embodiments of the present disclosure.

Figure 15:
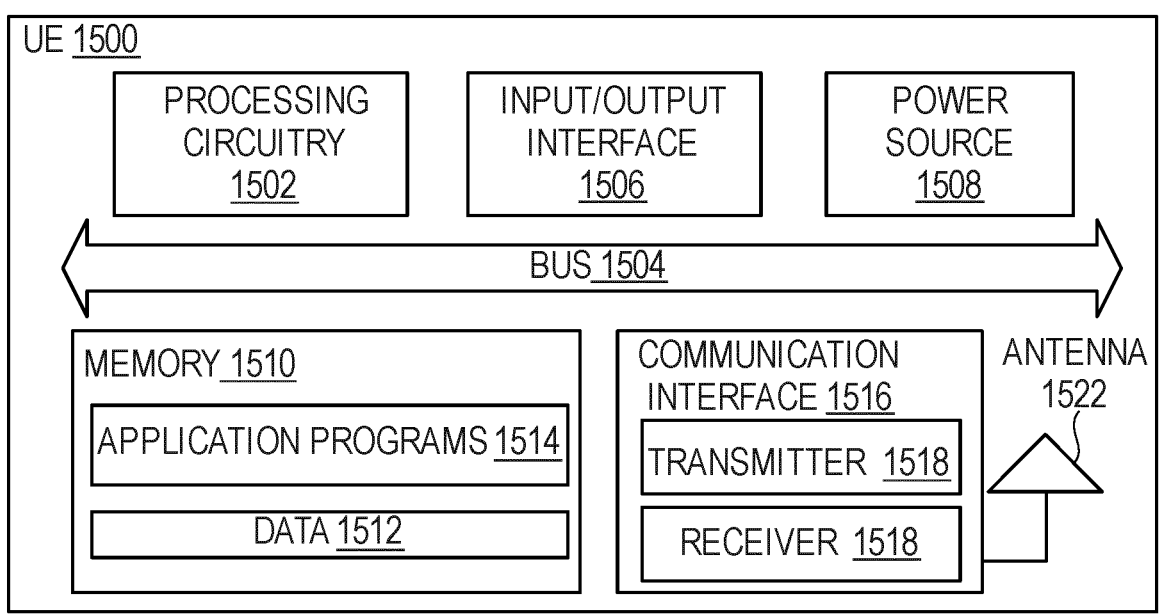

FIG. 15 shows a UE according to various embodiments of the present disclosure.

Figure 16:
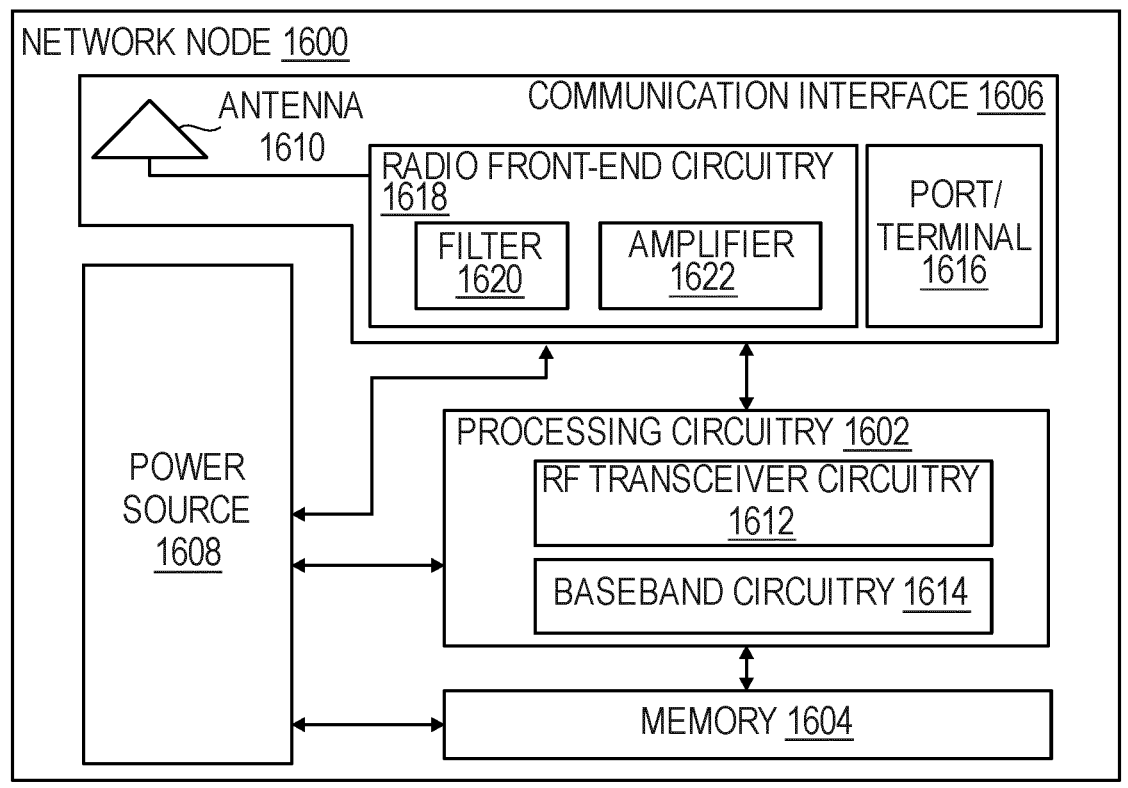

FIG. 16 shows a network node according to various embodiments of the present disclosure.

Figure 17:
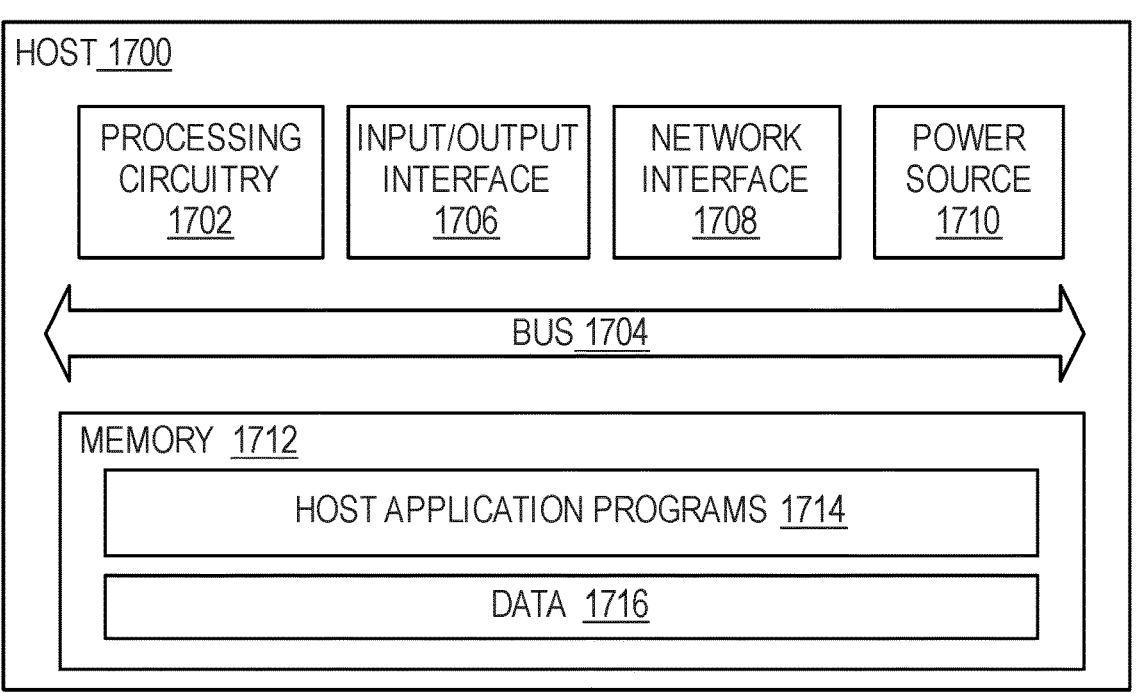

FIG. 17 shows host computing system according to various embodiments of the present disclosure.

Figure 18:
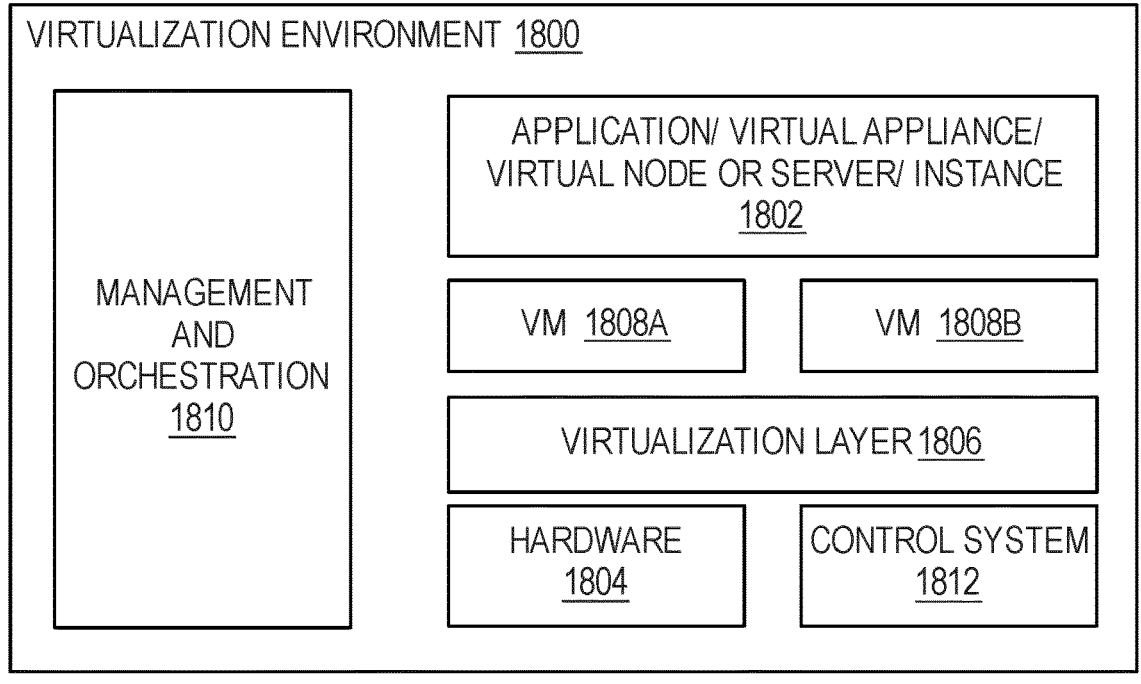

FIG. 18 is a block diagram of a virtualization environment in which functions implemented by some embodiments of the present disclosure may be virtualized.

Figure 19:
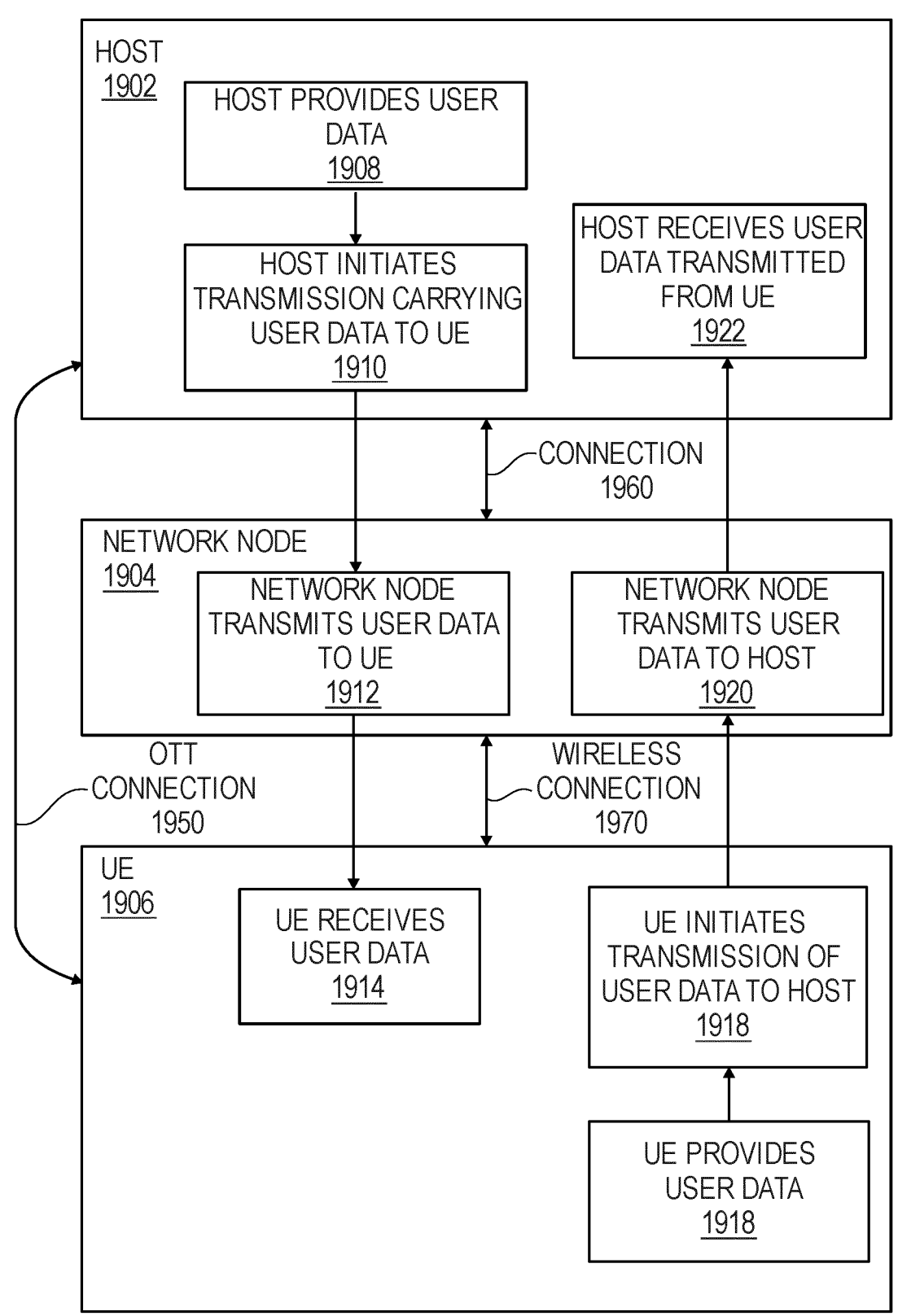

FIG. 19 illustrates communication between a host computing system, a network node, and a UE via multiple connections, according to various embodiments of the present disclosure.

DETAILED DESCRIPTION

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Network Node: As used herein, a "network node" is any node that is part of the core network (e.g., a core network node discussed above) of a telecommunications network. Functionally, a network node is equipment capable, configured, arranged, and/or operable to communicate directly or indirectly with a wireless or wired device and/or with other network nodes or equipment in the telecommunications network, to enable and/or provide wireless or wired access to the telecommunication device, and/or to perform other functions (e.g., administration) in the telecommunications network.

Node: As used herein, the term "node" (without any prefix) can be any type of node that is capable of operating in or with a telecommunication network (including a RAN and/or a core network), including a radio access node (or equivalent term), core network node, or telecommunications device.

Service: As used herein, the term "service" refers generally to a set of data, associated with one or more applications, which is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP telecommunications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a telecommunications device or a network node may be distributed over a plurality of telecommunications devices and/or network nodes.

Figure 1:
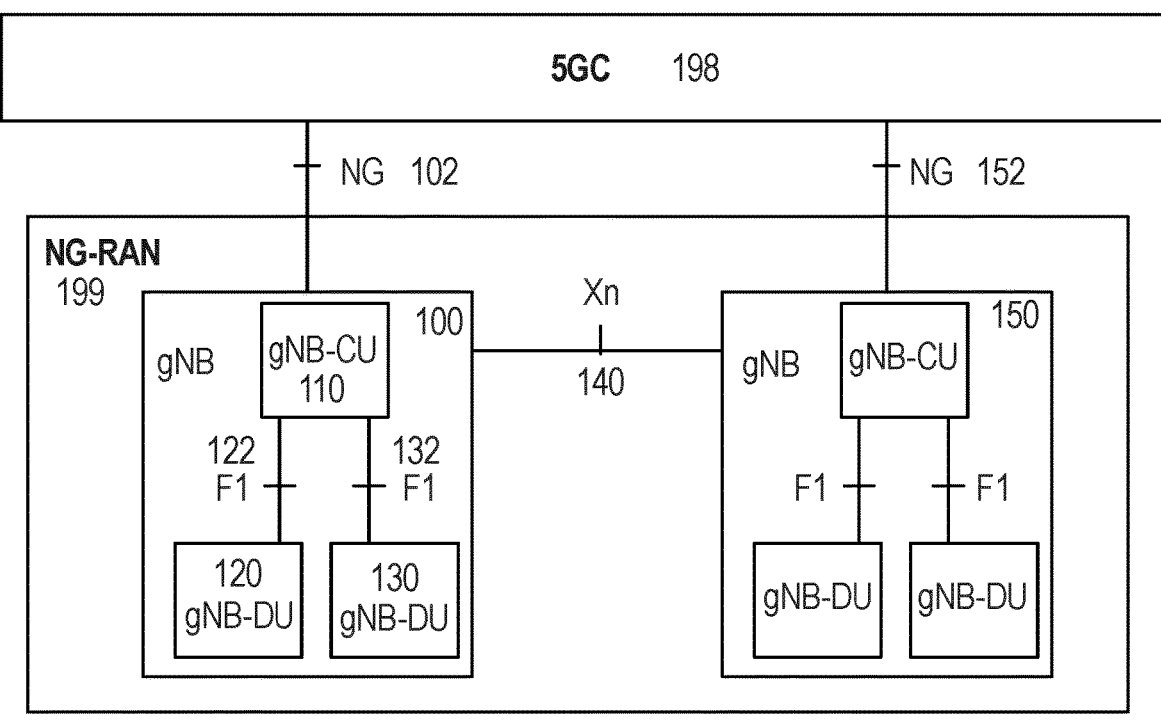
FIGS. 1-2 illustrate various aspects of an exemplary 5G network architecture.
Figure 2:
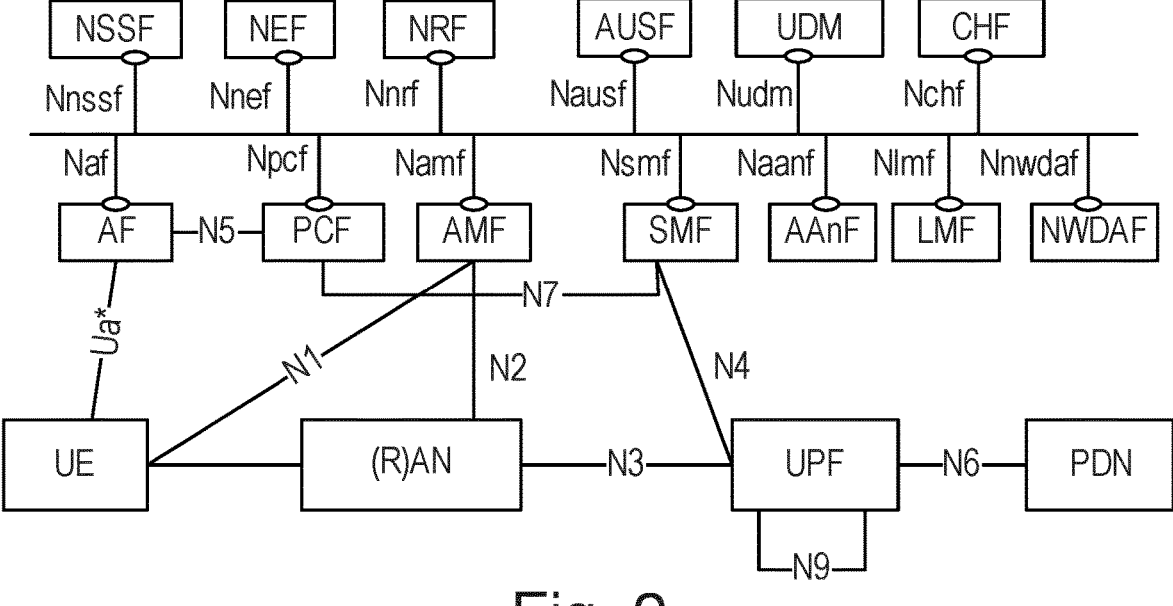

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface, described in more detail above and below.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF. The terms "UDM" and "UDM function" are used interchangeably herein.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

As mentioned above, the 5G Media Streaming Architecture was defined within 3GPP Rel-16 as an evolution of Packet Switched Streaming defined in 3GPP TS 26.234 (v15.1.0). The 5GMS architecture focuses on content delivery using dynamic adaptive streaming over HTTP (DASH) or HTTP live stream (HLS). 5GMS also defines additional media control-related procedures leverage and/or utilize the 5G UP. 5GMS supports both UL and DL streaming. Several functions are specific to either UL or DL (e.g., content hosting) but other functions (e.g., dynamic policy) are commonly used for both UL and DL streaming use-cases.

The 5GMS Architecture defines three main functions. A 5GMS Client is a type of an application enabler client (e.g., an OS-level function) that supports the 5G MS defined protocols and procedures. More specifically, 5GMS clients are either 5GMS DL (5GMSd) clients or 5GMS UL (5GMSu) clients, depending on the direction of streaming they support. In a simple case, a 5GMSd Client contains a Media Player, which is able to fetch and render 3GP-DASH (specified in 3GPP TS 26.247), MPEG-DASH (specified ISO/IES 23009-1), or Apple HLS (specified in IETF RFC 8216). In more advanced cases, the 5GMS Client contains a Media Session Handler (MSH), which invokes an API of a 5GMS AF.

Additionally, a 5GMS AF comprises media control functionality such as dynamic policy, consumption reporting, metric reporting, network assistance, etc. A 5GMS Client interacts with a 5GMS AF to either invoke a dynamic policy or to fetch information such as network assistance or QoS-related information. In addition, a 5GMS Application Server (AS) includes media-related functionality such as content hosting (e.g., storage or caching of media content), URL signing, server certificates, etc.

A 5GMS Application Provider (also referred to as an application service provider, or ASP) uses the 5GMS functions to provide an application service, such as a video or audio streaming service. The 5GMS Application Provider controls (and provides) the 5GMS Aware Application (5GMS AA) on the UE, which is enabled to use the 5GMS functions. The 5GMS Architecture allows placement of the above-described functions within a Trusted Data Network (DN) controlled by a mobile network operator (MNO) serving the UE (i.e., hosting the 5GMS client) or within an external DN (e.g., for an over-the-top or OTT application).

Figure 3:
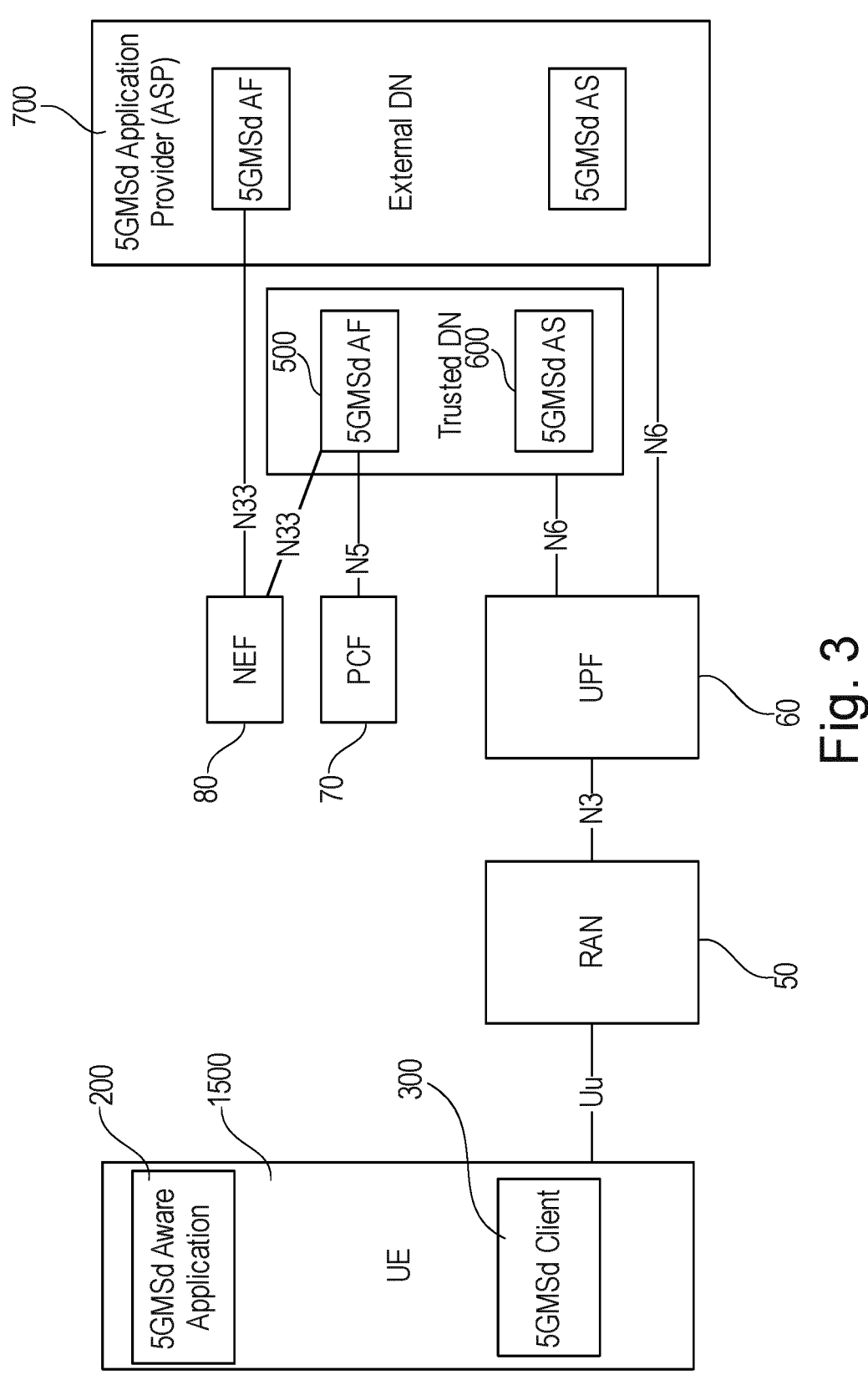
FIG. 3 is a block diagram of the 5GMS downlink (DL) architecture with network-level interfaces.

FIG. 3 is a block diagram of the 5GMS downlink architecture with corresponding network-level interfaces. In this example, the 5GMS Client 300 is in a UE 1500, together with a 5GMS Aware Application 200 which is a downstream (d) application case here. Note that FIG. 3 shows both options mentioned above, i.e., 5GMS AF 500 and 5GMS AS 600 in either the Trusted DN or in the External DN, where the 5GMS Application Provider (ASP) 700 is provided. Furthermore the UE 1500 is connected to the RAN 50 and the UPF 60 (via RAN 50). The ASP being connected to the NEF 80, with the 5GMS AF 500 being connected to the PCF 70.

Figure 4:
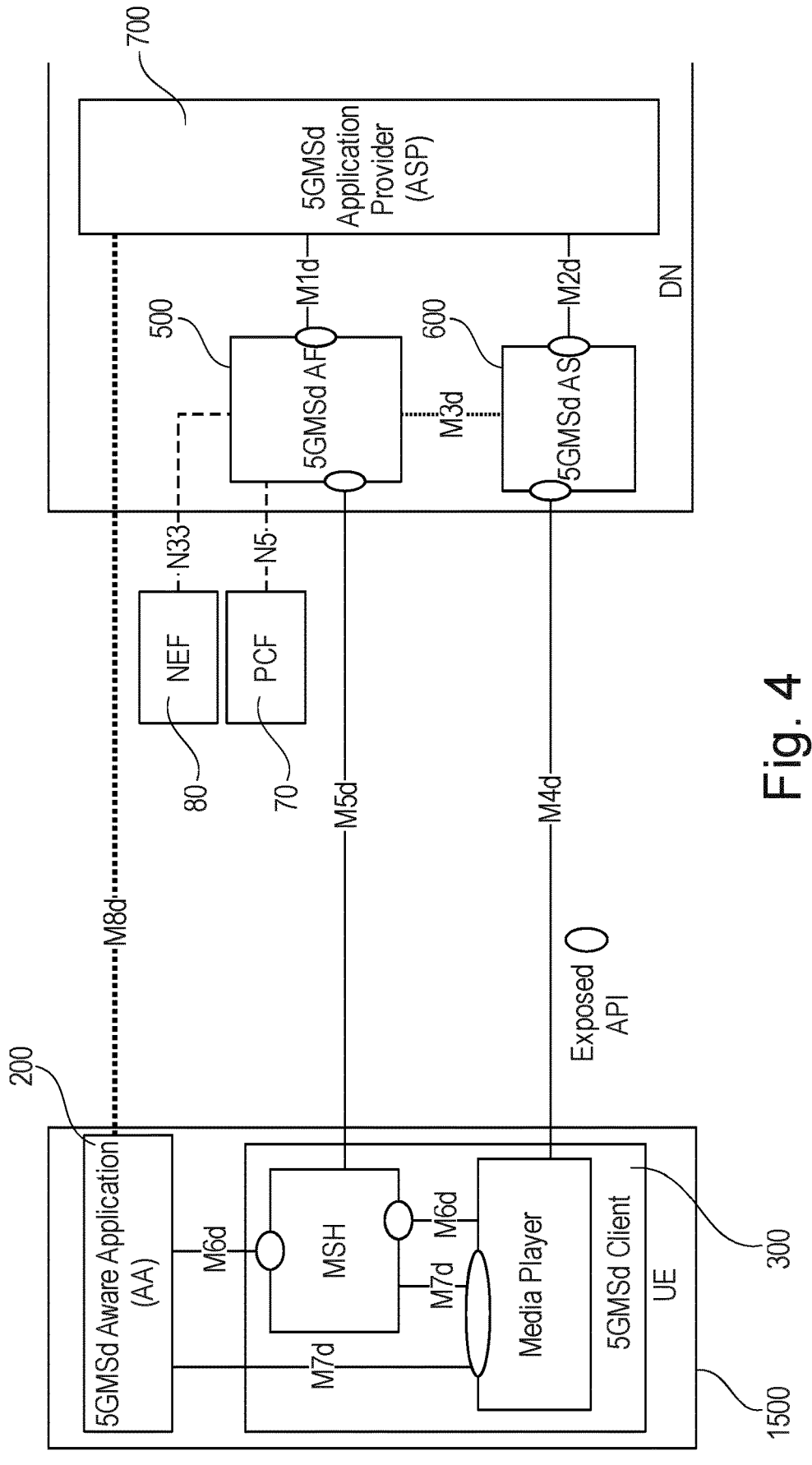
FIG. 4 shows an application-layer view of the 5GMS DL architecture.

FIG. 4 shows an application-layer view of the 5GMS DL architecture. In FIG. 4, certain 5GC NFs (e.g., UPF) that do not directly interact in the communications have been removed for clarity. Additionally, whether a 5GMS function is deployed within a trusted DN or an external DN is not visible on the application layer, so these two options have been abstracted to a more generic DN in FIG. 4. The 5GMS AF 500 and 5GMS AS 600 may be made aware through configuration, e.g., via NEF APIs instead of PCF APIs.

As illustrated by FIG. 4, the 5GMS Architecture defines the following set reference points between the different functions.

M1, provisioning reference point. M1d contains specific provisioning features for DL streaming.

M2, media reference points. For DL streaming (M2d), the 5GMS Application provider can ingest media data into the system. Both push and pull ingest are supported. For UL streaming (M2u), 5GMS Application Provider receives the data from the system.

M3, references point between the control functions (e.g., provisioning) and the media plane functions (e.g., content hosting). Not defined by 3GPP.

M4, media reference points. For DL streaming (M4d), the Media Player fetches the content. M4d may leverage 3GP-DASH as streaming format. For UL streaming (m4u), no format is currently defined but the FLUS formats (e.g., defined in 3GPP TS 26.238, 3GPP TR 26.939) may be supported.

M5, media session handling (MSH) reference point. For example, this API can be used for Dynamic Policy Invocation, metrics reporting, or other 5GMS functions.

M6 and M7. This are UE internal APIs between 5GMS AA and 5GMS functions. One API is used to control the media player (e.g., DASH Player) and the other API for interacting with the MSH.

M8 (M8d, M8u), provisioning reference point(s). Not defined by 3GPP but used for provisioning of the 5GMS features.

Figure 5:
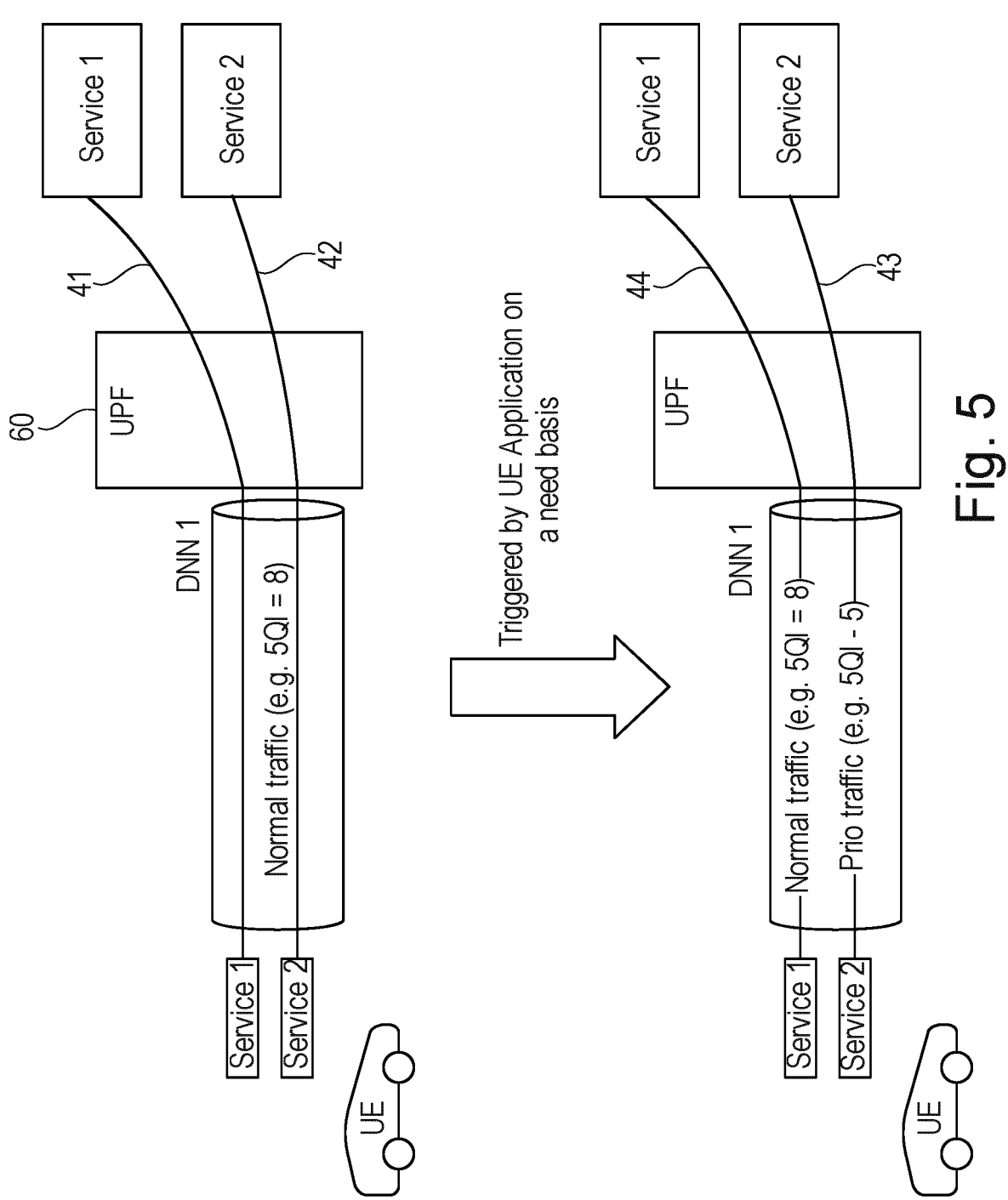
FIGS. 5-6 illustrate various aspects of an exemplary dynamic policy invocation procedure.

The Dynamic Policy (or Dynamic Policy invocation) procedure via the M5 reference point enables a UE application to activate a new 3GPP system policy, such as a QoS policy or a charging related policy. FIG. 5 shows an example dynamic policy invocation procedure for a QoS policy. The upper part of FIG. 5 depicts the initial setup: multiple application flows 41 and 42 from two services (1 and 2) use the same protocol data unit (PDU) session with a single QoS flow identifier (e.g., 5QI=8). It is desirable, however, to assign the application flow from service 2 into a different QoS flow. This can be triggered, for example, by the UE application on an as-needed basis. The bottom part of FIG. 5 shows the resulting arrangement where priority traffic, flow 43 from service 2 is assigned to a different QoS flow identifier (i.e., 5QI=5) than flow 44.

A similar example can be realized based on charging differentiation. The UPF should associate data of service 2 with a different rating group than data from service 1. In case of charging separation, however, only different rating groups are needed, not different QoS flows.

Figure 6:
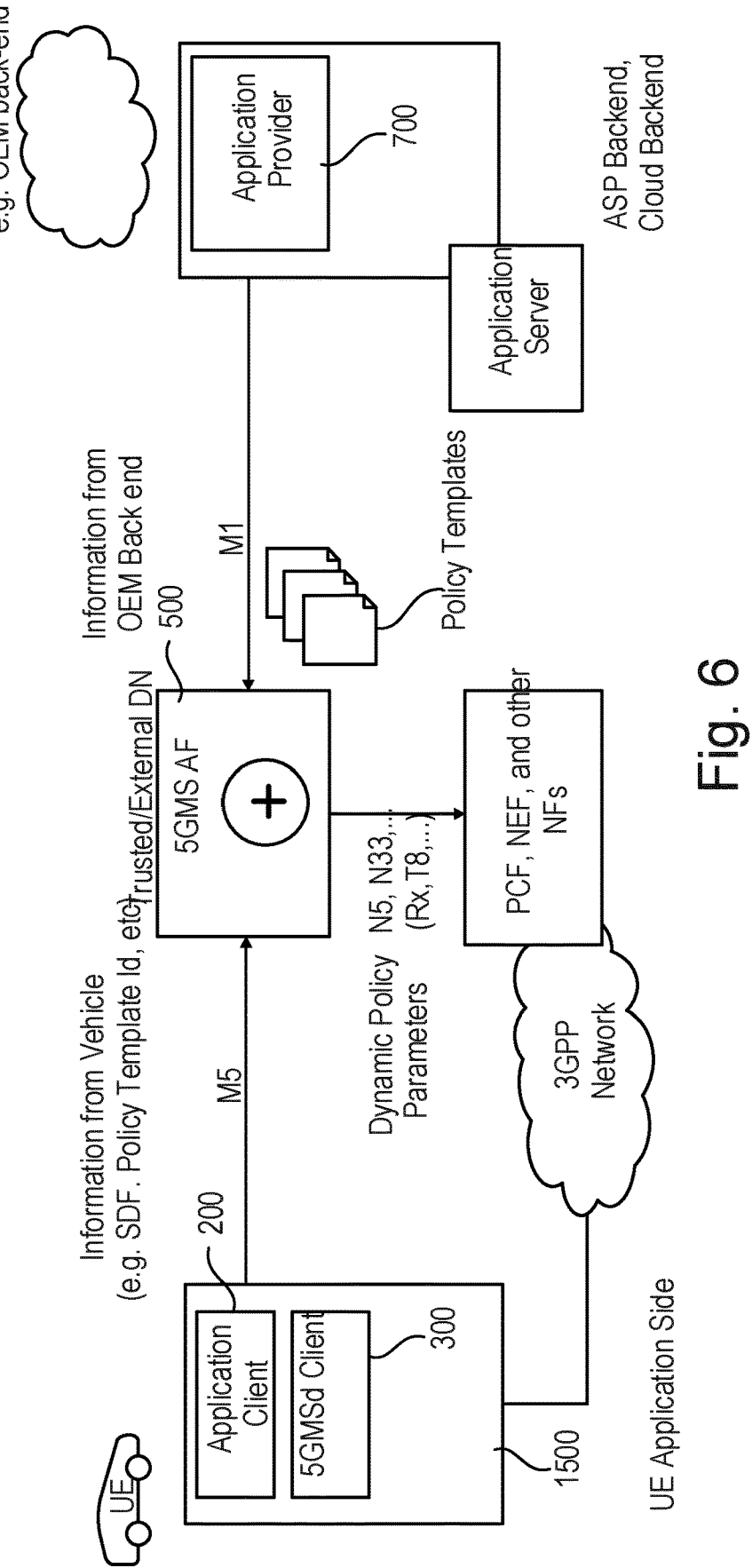

FIG. 6 shows an exemplary information flow for the dynamic policy invocation procedure. In this example, the UE 1500 (which can be in a vehicle) can include the 5GMS client 300 and the application client 200. The 5GMS Client 300 (or the MSH in the 5GMS Client) triggers the dynamic policy invocation procedure using M5 API and provides needed information, including which policy should be applied and how to identify the application traffic.

The 5GMS application provider 700 provisions policy templates within the 5GMS system using the M1 API. Each policy template is associated with an identifier (ID) and contains policy information such as API server URL (e.g., including address of NEF or PCF) and the API keys (e.g., authorization information for NEF or PCF API). The policy template may also contain additional information such as QoS reference string, Data Network Name (DNN), ASP identifier, network slice identifier, etc.

When the UE Application Client 200 invokes the new dynamic policy API, the MSH provides the relevant policy template ID and traffic detection information in the form of Service Data Flow (SDF) descriptions. The SDF specifies the to-be-policed application traffic, e.g., as a 5-Tuple IP Packet Filter Set or by using other identifies such as a type of service (ToS) field.

The 5GMS AF 500 combines the information received from the UE application with the previously provisioned policy templates and triggers a dynamic policy and charging control (PCC) rule creation, either via the PCF (using N5 interface) or via the NEF (using N33 interface). When using the NEF, the 5GMS AF may use Nnef_AFsessionWithQoS or NnefChargeableParty API calls, depending on the policy of interest.

One issue is the UE application authorization, specifically whether the UE application, providing the SDF description is actually authorized to activate a dynamic policy. For example, UE application 1 (e.g., a video streaming application from an ASP 1) should not be allowed to re-use policies the UE application previously obtained from a different ASP 2. As a more specific example, when policy usage is subsidized by the ASP or when specific QoS should be used, it should be verified that the UE application is actually authorized to activate the policy that it identified. In other words, it should be verified that the UE application is associated with the same ASP as the policy that the UE application attempts to invoke.

Figure 7:
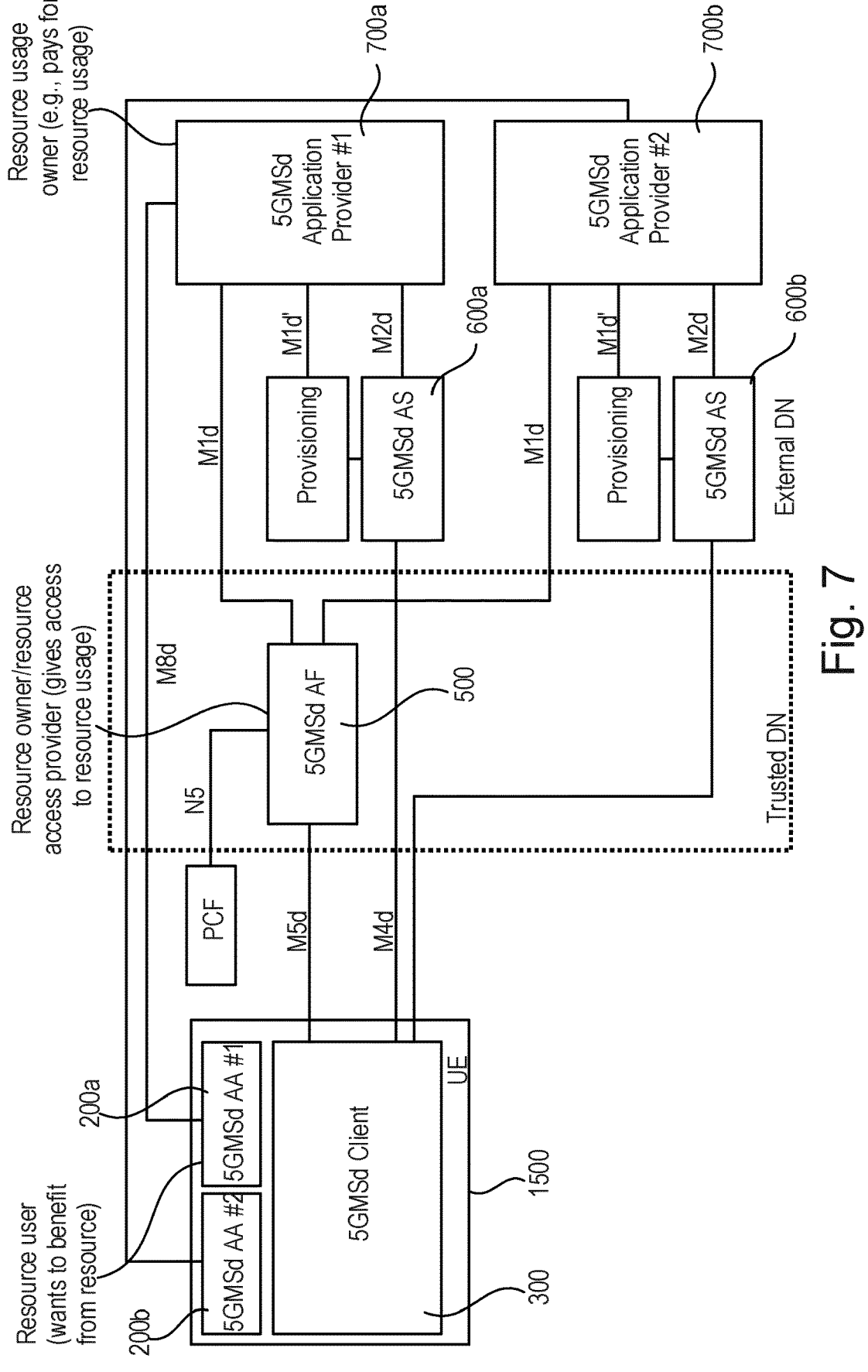
FIG. 7 shows an example arrangement that illustrates certain problems related to authorization of a UE application to invoke or activate a dynamic policy.

FIG. 7 shows an example arrangement that illustrates this authorization problem in a downstream environment. In this arrangement, the UE includes a 5GMS client 300, which in the present case is a 5GMSd (d for downstream) and two 5GMS Aware Applications 200a, 200b, i.e., Application #1 associated with 5GMS ASP #1 700a and 5GMS AS 600a and Application #2 associated with 5GMS ASP #2 700b and a 5GMS AS 600b. In this example, ASP #1 has negotiated the usage of a QoS policy with the MNO, e.g., to provide a 4K video streaming service high reliably and high quality. This negotiated QoS policy can be specified in a service level agreement (SLA) between ASP #1 and the MNO. As such, the MNO is referred to as the "resource owner," Application #1 is referred to as the "resource user," and ASP #1 is referred to as the "resource usage owner." It should be understood that the idea described in the present application can be also used in an upstream environment, where the entities having a "d" at the end shown in the Figures would be replaced by the corresponding entities having a "u" at the end for uplink. When no suffix is used in the text, both situations, uplink and downlink should be covered. The present application can be used for both the uplink and downlink situation.

In this arrangement, only applications associated with ASP #1 700a should be able to invoke the policies subject to the SLA. For example, Application #2 from ASP #2 700b should be prevented from invoking the policies subject to this SLA, since ASP #2 may have other policies specified in another SLA with the MNO. In case of OAUTH 2.0, the resource owner is the user of the UE application, who is using the network resources under a general application service subscription. As such, the OAUTH 2.0 model is not directly applicable to the scenario shown in FIG. 7.

Accordingly, embodiments of the present disclosure address these and other problems, issues, and/or difficulties by enabling a 5GMS AF 500 to perform some authorization checking with the ASP. To facilitate this checking, the 5GMS client 300 provides an authorization token (e.g., via M5) that can be verified by the 5GMS AF 500, either on its own or by using an immediate callback with the ASP 700a/700b (e.g., via M1). In essence, such techniques introduce a resource usage owner role in an OAUTH-like authentication and authorization architecture. When an ASP 700a/700b has an SLA with an MNO, the ASP needs to authorize resource usage by UE applications only within the bounds of the SLA. The ASP may want to ensure, that UE applications use network resources only according to the Application Service Subscription.

Embodiments are described below in the context of two different use cases, referred to as QoS flow and zero-rating. In the QoS flow use case, the ASP 700a/700b offers subscriptions of different quality levels, e.g., 4K video quality subscription, HD video quality, and SD video quality. The ASP has setup an SLA with one or more MNOs to provide appropriate network level QoS to support the application subscription quality levels. The QoS-related connectivity usage charges are part of the subscription offered by the ASP and, thus, paid for by the ASP.

In the zero-rating use case, the ASP 700a/700b has a zero-rating agreement with the MNO. When the video quality remains below a certain threshold (e.g., SD), the end-user is not charged for the network data usage. The UE application ensures that the media player is not selecting a higher-quality representation not covered by the zero-rating agreement between MNO and ASP.

A general assumption is that the user has an application (e.g., video) service subscription with the ASP. Thus, the user authorizes itself (and UE application client) with the ASP backend. Even without network-level resource usage, the ASP needs to authorize the user/UE for consuming content at a particular quality level (e.g., 4K). The embodiments described below augment this authorization procedure to include authorization for network-level resource. Two specific techniques are described below, namely a callback mechanism and token pre-reprovisioning.

Figure 8:
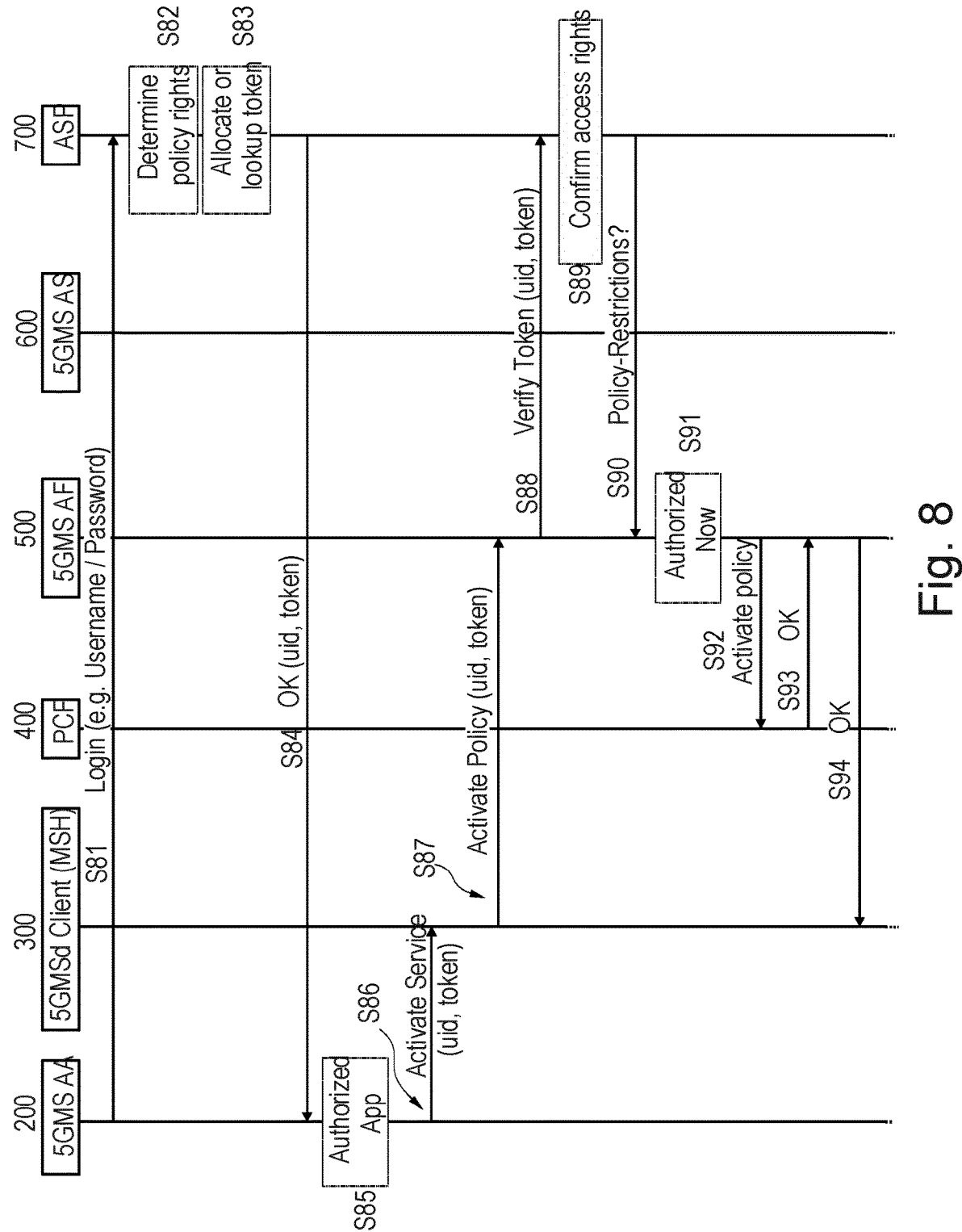
FIG. 8 shows a signal flow diagram of an authorization procedure based on a callback mechanism, according to some embodiments of the present disclosure.

FIG. 8 shows a signal flow diagram of an authorization procedure based on a callback mechanism, according to some embodiments of the present disclosure. This procedure is based on an authorization token (e.g., a random number or a random string) provided by the ASP 700 to the 5GMS AA 200 (via M8) and from the 5GMS AA 200 to the 5GMS client (MSH) 300 (via M6). When the MSH wants to activate a dynamic policy, the MSH passes the authorization token to the 5GMS AF 500 (via M5). Upon receiving the authorization token, the 5GMS AF executes a callback to the ASP 700 to verify whether the authorization token is valid. When the token is valid, the UE application is authorized to activate this policy.

The authorization token can be provided during a login procedure (e.g., with a login response) or can be requested and provided after login (e.g., together with other application service specific metadata). The signalling in FIG. 8 assumes that the authorization token is provided with the login response. The 5GMS AA may provide some mobile network information (e.g., public land mobile network (PLMN) identifier) with the authorization token request, which can facilitate MNO-specific tokens.

In the following the message flow of FIG. 8 is explained in more detail.

When the user wants to use the 5GMS AA 200 to consume video content, the user needs to authenticate itself towards the 5GMS AA 200 and towards the ASP 700. In some cases, this authorization can be cached/stored by the 5GMS AA, so that the user is not always bothered with entering login credentials. The user authentication may be based on a username and password or on other credential information which is sent in step S81 to the ASP 700. The 5GMS AA 200 can be a native application, such as an Android or iOS application. Alternatively, the 5GMS AA can be a browser application, such as a webpage.

The 5GMS Application Provider (i.e., ASP) determines in step S82 policy rights for this application service subscription. For example, the user may have subscribed to an SD quality video service, an HD quality video service, or a 4K quality video service. The ASP creates an authorization token (S83) according to the subscription level and passes this token together with the login response to the App, the 5GMS AA 200 (S84).

When the 5GMS AA then (immediately or later) leverages the 5GMS Client 300 to activate the network service (S85) from the 5GMS AF 500, the 5GMS AA 200 passes the authorization token to the MSH in the 5GMS Client 300 (S86). The authorization token is here provided together with a user ID (uid) to separate the authorization from user identification. In some cases, the authorization token may also include the uid, e.g., in encrypted form.

When the MSH activates a dynamic policy in S87, it provides the uid and the authorization token to the 5GMS AF 500, e.g., as query line parameters. The 5GMS AF 500 verifies the authorization token with the ASP using a callback function. This callback function can be realized as an HTTP REST service and the ASP may have stored a callback URL together with the policy template parameters. In step S88 a request is sent to the ASP 700 to verify the token and in step S89 the ASP 700 confirms the requested access rights. The one or more policy templates are provisioned by the ASP (via M1) during a provisioning procedure in S90. In addition to the authorization token, the M5 dynamic policy invocation call includes the SDFs and the policy template ID.

When the 5GMS AF 500 has verified based on the received authentication token that the UE 5GMS AA 200 is authorized to activate the dynamic policy (S91), the 5GMS AF executes the corresponding procedure towards the NEF or PCF 400 (S92 and S93). For example, the 5GMS AF 500 triggers the addition of a QoS flow using the Nnef_AFses-sionWithQoS API towards NEF. In step S94 a policy con-firmation is sent back in response to step S87.

Figure 9:
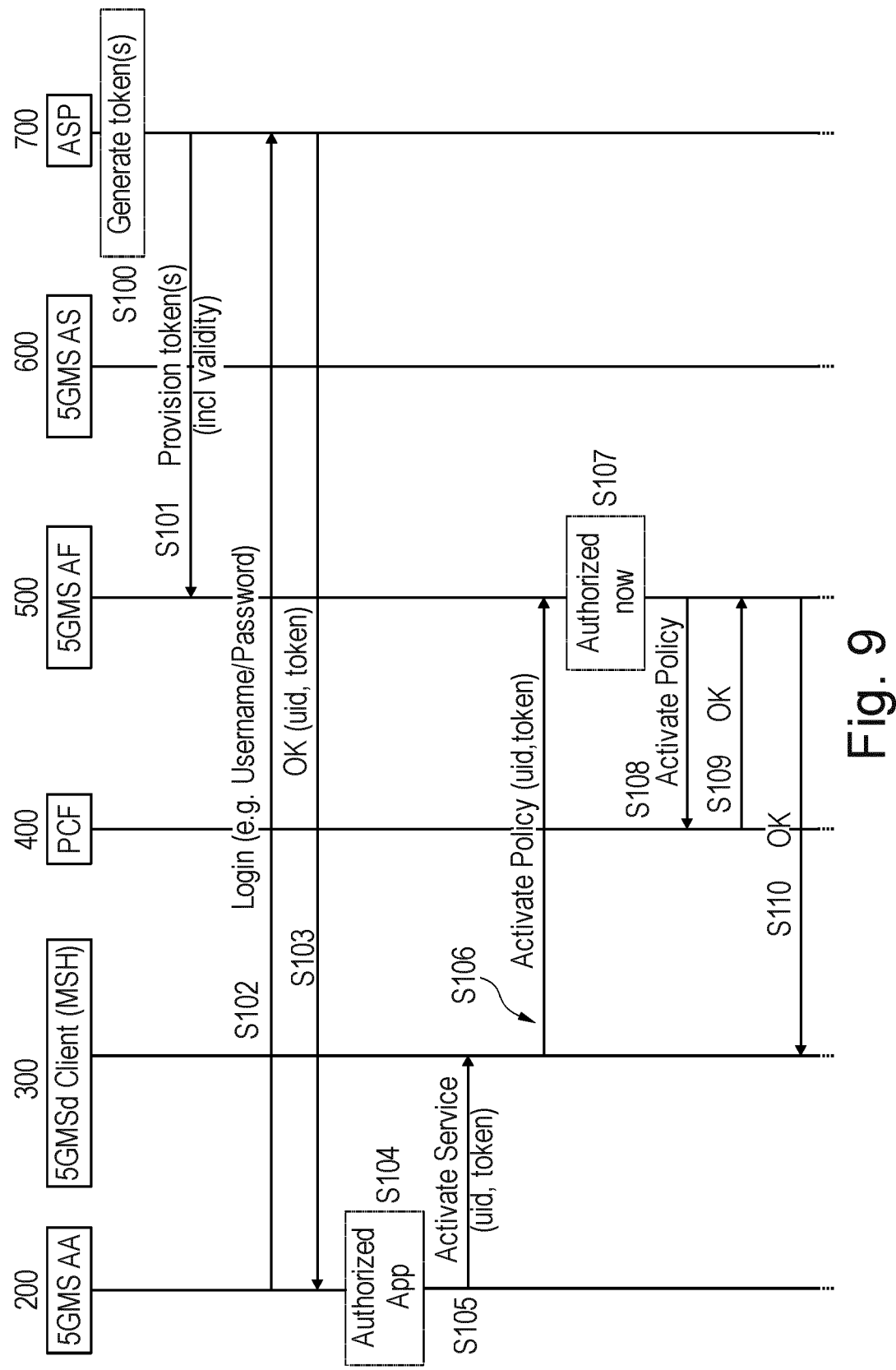
FIG. 9 shows a signal flow diagram of an authorization procedure based on pre-provisioned authorization tokens, according to other embodiments of the present disclosure.

FIG. 9 shows a signal flow diagram of an authorization procedure based on pre-provisioned authorization tokens, according to other embodiments of the present disclosure. In these embodiments, the authorization token (e.g., a random number or a random string) can be used by the 5GMS AF 500 for multiple authorization procedures (even for different users) for some validity duration. The authorization token is provisioned (with a validity duration) to the 5GMS AF 500 during a provisioning operation or a provisioning update operation. Alternatively, the 5GMS AF may be configured to automatically renew the authorization token, such that the 5GMS AF 500 contacts the 5GMS Application Provider (i.e., ASP) 700 periodically to obtain a new token.

Like the embodiments illustrated by FIG. 8, the MSH of the 5GMS Client 300 passes the authorization token with any M5 call to the 5GMS AF 500, which authorizes the MSH based on this token. At or before the end (or expira-tion) of a token's limited validity duration, the ASP 700 must somehow update the tokens at the UE 5GMS AA 200. For example, a new token can be passed to the 5GMS AA 200 when the user authorizes itself as an application service consumer. Alternately, the 5GMS AA 200 may be configured to automatically fetch a new token periodically.

In the embodiments illustrated by FIG. 9, the ASP needs to provision authorization tokens before any UE 5GMS AA 200 tries to activate a corresponding network service. The token is generated in step S100 by the ASP 700 and transmitted to the 5GMS AF 500 in step S101 together with a validity of the token. This token provisioning (or pre-provisioning) can be done together with other 5GMS pro-visioning, e.g., of policy template definitions. When a user (and the associated 5GMS AA 200) identifies and authorizes itself towards the ASP 700 in step S102 and S103 similar to steps S81 and S84, the 5GMS AA receives an authorization token. The UE may store the token, like in the other alternative. Steps S104 to S110 correspond to steps S85 to S87 and S91 to S94.

One difference from the embodiments illustrated by FIG. 8 is the use of the authentication token by the 5GMS AF 500. When a 5GMS AA 200 tries to activate a network service (e.g., dynamic policy), it provides (via 5GMS Client 300) the authorization token to the 5GMS AF 500. The 5GMS AF 500 is then executing a validity check procedure, based on an earlier-provisioned authorization token. One benefit of this approach is that the 5GMS AF 500 does not need to contact the ASP 700 for every policy activation request by a 5GMS AA (via the 5GMS Client).

The embodiments described above can be further illus-trated with reference to FIGS. 10-13, which depict exem-plary methods (e.g., procedures) for a 5GMS AA 200, a 5GMS client 300, a 5GMS AF 500, and an ASP 700, respectively. Put differently, various features of the opera-tions described below correspond to various embodiments described above. The exemplary methods shown in FIGS. 6-8 can be used cooperatively (e.g., with each other and with other procedures described herein) to provide benefits, advantages, and/or solutions to problems described herein. Although the exemplary methods are illustrated in FIGS. 6-8 by specific blocks in particular orders, the operations cor-responding to the blocks can be performed in different orders than shown and can be combined and/or divided into blocks and/or operations having different functionality than shown. Optional blocks and/or operations are indicated by dashed lines.

In particular, FIG. 10 illustrates an exemplary method (e.g., procedure) for a 5GMS Aware Application (AA) 200 hosted by a UE operating in a communication network (e.g., NG-RAN, 5GC, etc.), according to various embodiments of the present disclosure. For example, the exemplary method shown in FIG. 10 can be performed by a 5GMS AA (or a UE hosting the same) such as described elsewhere herein.

The exemplary method can include the operations of block 1010, where the 5GMS AA 200 can obtain, from an application service provider (ASP) 700 associated with the 5GMS AA, a token indicating that the 5GMS AA is autho-rized to invoke or activate a dynamic policy for resources of the communication network, wherein the dynamic policy is associated with the ASP. The exemplary method can also include the operations of block 1020, where the 5GMS AA 200 can send the token to a 5GMS client 300 hosted by the UE. The 5GMS client is associated with a 5GMS application function (AF) 500 of the communication network.

In some embodiments, the dynamic policy is a QoS policy. In other embodiments, the dynamic policy is a zero-rating policy. In some embodiments, the token is sent (e.g., in block 1020) to a media session handler (MSH) of the 5GMS client.

In some embodiments, obtaining the token in block 1010 can include the operations of sub-block 1011, where the 5GMS AA can send a login request to the ASP 700 and receive a login response from the ASP, with the token being received in the login response. In some of these embodi-ments, the login request includes a username and password associated with a user of the 5GMS AA and the login response also includes a user identifier (uid) corresponding to the username. In such case, the uid is sent to the 5GMS client together with the token.

In some embodiments, the token is associated with a validity duration and the exemplary method can also include the operations of block 1040, where the 5GMS AA 200 can, in association with expiration of the validity duration, obtain from the ASP 700 an updated token indicating that the 5GMS AA is authorized to invoke or activate the dynamic policy. In such case, the updated token is associated with an updated validity duration. In some of these embodiments, the exemplary method can also include the operations of block 1050, where the 5GMS AA 200 can send the updated token to the 5GMS client 300.

In some embodiments, the exemplary method can also include the operations of block 1060, where the 5GMS AA 200 can transmit or receive data, via the communication network in accordance with the dynamic policy, during a media session between the 5GMS AA and the ASP. This can be done, for example, after the dynamic policy has been activated. In some embodiments, the data is received via dynamic adaptive streaming over HTTP (DASH) or HTTP live stream (HLS).

In addition, FIG. 11 illustrates an exemplary method (e.g., procedure) for a 5GMS client 300 hosted by a UE operating in a communication network (e.g., NG-RAN, 5GC, etc.), according to various embodiments of the present disclosure. For example, the exemplary method shown in FIG. 11 can be performed by a 5GMS client (or a UE hosting the same) such as described elsewhere herein.

The exemplary method can include the operations of block 1110, where the 5GMS client 300 can receive, from a 5GMS AA 200 hosted by the UE, a token indicating that the 5GMS AA is authorized to invoke or activate a dynamic policy for resources of the communication network. The dynamic policy is associated with an ASP 700 associated with the 5GMS AA 200. The exemplary method can also include the operations of block 1120, where the 5GMS client 300 can send the token to a 5GMS AF 500 of the communication network in a request to activate the dynamic policy for the 5GMS AA. The exemplary method can also include the operations of block 1130, where the 5GMS client 300 can receive, from the 5GMS AF 500, a response indicating that the dynamic policy is activated for the 5GMS AA in accordance with the token.

In some embodiments, the dynamic policy is a QoS policy. In other embodiments, the dynamic policy is a zero-rating policy. In some embodiments, the token is received from the 5GMS AA (e.g., in block 1110) and sent to the 5GMS AF (e.g., in block 1120) by a MSH of the 5GMS client.

In some embodiments, the token is received (e.g., in block 1110) together with user identifier (uid) corresponding to a username associated with a user of the 5GMS AA, and the uid is sent to the 5GMS AF 500 (e.g., in block 1120) together with the token.

In some embodiments, the token is associated with a validity duration and the exemplary method can also include the operations of block 1150, where the 5GMS client 300 can, in association with expiration of the validity duration, receive from the 5GMS AA 200 an updated token indicating that the 5GMS AA 200 is authorized to invoke or activate the dynamic policy. The updated token is associated with an updated validity duration. In some of these embodiments, the exemplary method can also include the operations of blocks 1160-1170, where the 5GMS client 300 can send the updated token to the 5GMS AF 500 in a request to activate the dynamic policy for the 5GMS AA and receive, from the 5GMS AF, a response indicating that the dynamic policy is activated for the 5GMS AA 200 in accordance with the updated token.

In some embodiments, the exemplary method can also include the operations of block 1140, where the 5GMS client can transmit or receive data with a 5GMS application server (AS) via the communication network in accordance with the dynamic policy. The data is associated with a media session between the 5GMS AA and the ASP. This can be done, for example, after the dynamic policy has been activated. In some embodiments, the data can be received via DASH or HLS.

In addition, FIG. 12 illustrates an exemplary method (e.g., procedure) for a 5GMS AF 500 associated with a communication network (e.g., 5GC, etc.), according to various embodiments of the present disclosure. For example, the exemplary method shown in FIG. 12 can be performed by a 5GMS AF (or a network node or computing platform hosting the same) such as described elsewhere herein.

The exemplary method can include the operations of block 1220, where the 5GMS AF 500 can receive, from a 5GMS client 300 hosted by a UE operating in the communication network, a token indicating that a 5GMS AA 200 hosted by the UE is authorized to invoke or activate a dynamic policy for resources of the communication network. The dynamic policy is associated with an ASP 700 that is associated with the 5GMS AA, and the token is received in a request to activate the dynamic policy for the 5GMS AA. The exemplary method can include the operations of blocks 1230-1230, where the 5GMS AF 500 can, based on determining that the token is valid, send to the 5GMS client a response indicating that the dynamic policy is activated.

In some embodiments, the dynamic policy is a QoS policy. In other embodiments, the dynamic policy is a zero-rating policy.

In some embodiments, the exemplary method can also include the operations of block 1210, where the 5GMS AF 500 can receive, from the ASP 700, a further token indicating that the 5GMS AA is authorized to invoke or activate the dynamic policy. In such case, determining that the token is valid in block 1230 includes the operations of sub-block 1231, where the 5GMS AF 500 can verify that the token received from the 5GMS AA 200 matches the further token received from the ASP. In some of these embodiments, the further token includes a validity duration and determining that the token is valid in block 1230 includes the operations of sub-block 1232, where the 5GMS AF can verify that the token is received from the 5GMS AA before expiration of the validity duration. FIG. 8 shows an example of these embodiments.

In some variants, the exemplary method can also include the operations of block 1270, where the 5GMS AF 500 can receive, from the ASP 700, an updated further token indicating that the 5GMS is authorized to invoke or activate the dynamic policy. The updated further token is associated with an updated validity duration. In some further variants, the exemplary method can also include the operations of blocks 1280-1290, where the 5GMS AF 500 can subsequently receive an updated token from the 5GMS client in a request to activate the dynamic policy for the 5GMS AA and based on determining that the updated token is valid, send to the 5GMS client a response indicating that the dynamic policy is activated. The updated token is associated with the updated validity duration.

In other embodiments, determining that the token is valid in block 1230 includes the operations of sub-blocks 1233-1234, where the 5GMS AF 500 can send the token to the ASP 700 and receive from the ASP a response indicating that the 5GMS AA 200 is authorized to activate the dynamic policy. In some of embodiments, the token is received from the 5GMS client 300 (e.g., in block 1220) together with a user identifier (uid) corresponding to a username associated with a user of the 5GMS AA and the token is sent to the ASP (e.g., in sub-block 1233) together with the uid. FIG. 9 shows an example of these embodiments.

In some embodiments, the exemplary method can also include the operations of blocks 1240-1250, where based on determining (e.g., in block 1230) that the token is valid, the 5GMS AF can send to a PCF of the communication network a request to activate the dynamic policy and receive from the PCF 400 a response indicating that the dynamic policy is activated. The response is sent to the 5GMS client (e.g., in block 1260) based on the response from the PCF 400.

In addition, FIG. 13 illustrates an exemplary method (e.g., procedure) for an ASP 700 associated with a 5GMS AA hosted by a UE operating in a communication network (e.g., 5GC, etc.), according to various embodiments of the present disclosure. For example, the exemplary method shown in FIG. 13 can be performed by an ASP (or a network node or computing platform hosting the same) such as described elsewhere herein.

The exemplary method can include the operations of block 1310, where the ASP 700 can provide, to the 5GMS AA 200, a token indicating that the 5GMS AA 200 is authorized to invoke or activate a dynamic policy for resources of the communication network, wherein the dynamic policy is associated with the ASP 700. In some embodiments, the dynamic policy is a QoS policy. In other embodiments, the dynamic policy is a zero-rating policy.

In some embodiments, providing the token in block 1310 includes the operations of sub-block 1311, where the ASP 700 can receive a login request from the 5GMS AA 200 and send a login response to the 5GMS AA, with the token being sent in the login response. In some of these embodiments, the login request includes a username and password associated with a user of the 5GMS AA, the login response also includes a user identifier (uid) corresponding to the username, and the uid is sent to the 5GMS client together with the token.

In some embodiments, the token is associated with a validity duration and the exemplary method can also include the operations of block 1380, where the ASP 700 can, in association with expiration of the validity duration, provide to the 5GMS AA 200 an updated token indicating that the 5GMS AA 200 is authorized to invoke or activate the dynamic policy. The updated token is associated with an updated validity duration.

In some embodiments, the exemplary method can also include the operations of blocks 1320-1330 and 1350. In block 1320, the ASP 700 can receive, from a 5GMS AF 500 associated with the communication network, a further token indicating that the 5GMS AA 200 is authorized to invoke or activate the dynamic policy sending the token to the ASP. In block 1330, the ASP 700 can verify that the further token received from the 5GMS AF 500 matches the token provided to the 5GMS AA. In block 1350, the ASP can send to the 5GMS AF a response indicating that the 5GMS AA 200 is authorized to activate the dynamic policy. FIG. 8 shows an example of these embodiments.

In some of these embodiments, the token is associated with a validity duration and the exemplary method can also include the operations of block 1340, where the ASP 700 can verify that the further token is received from the 5GMS AF before expiration of the validity duration. In other words, sending the response in block 1350 can also be based on the verification in block 1340.

In other embodiments, the exemplary method can also include the operations of block 1360, where the ASP 700 can send the token to a 5GMS AF 500 associated with the communication network. FIG. 9 shows an example of these embodiments. In some of these embodiments, the token is associated with a validity duration and the exemplary method can also include the operations of block 1390, where the ASP 700 can, in association with expiration of the validity duration, send to the 5GMS AF an updated token indicating that the 5GMS is authorized to invoke or activate the dynamic policy. The updated token is associated with an updated validity duration.

In some embodiments, the exemplary method can also include the operations of block 1370, where the ASP 700 can transmit or receive data, via the communication network in accordance with the dynamic policy, during a media session between the 5GMS AA 200 and the ASP 700. This can be done, for example, after the dynamic policy has been activated. In some embodiments, the data can be transmitted via DASH or HLS.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

FIG. 14 shows an example of a communication system 1400 in accordance with some embodiments. In this example, the communication system 1400 includes a telecommunication network 1402 that includes an access network 1404, such as a radio access network (RAN), and a core network 1406, which includes one or more core network nodes 1408. The access network 1404 includes one or more access network nodes, such as network nodes 1410a and 1410b (one or more of which may be generally referred to as network nodes 1410), or any other similar 3$^{rd}$ Generation Partnership Project (3GPP) access node or non-3GPP access point. The network nodes 1410 facilitate direct or indirect connection of user equipment (UE), such as by connecting UEs 1412a, 1412b, 1412c, and 1412d (one or more of which may be generally referred to as UEs 1412) to the core network 1406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1400 may include any number of wired or wireless networks, network nodes, UEs, and/or any other components or systems that may facilitate or participate in the communication of data and/or signals whether via wired or wireless connections. The communication system 1400 may include and/or interface with any type of communication, telecommunication, data, cellular, radio network, and/or other similar type of system.

The UEs 1412 may be any of a wide variety of communication devices, including wireless devices arranged, configured, and/or operable to communicate wirelessly with the network nodes 1410 and other communication devices. Similarly, the network nodes 1410 are arranged, capable, configured, and/or operable to communicate directly or indirectly with the UEs 1412 and/or with other network nodes or equipment in the telecommunication network 1402 to enable and/or provide network access, such as wireless network access, and/or to perform other functions, such as administration in the telecommunication network 1402.

In the depicted example, the core network 1406 connects the network nodes 1410 to one or more hosts, such as host 1416. These connections may be direct or indirect via one or more intermediary networks or devices. In other examples, network nodes may be directly coupled to hosts. The core network 1406 includes one more core network nodes (e.g., core network node 1408) that are structured with hardware and software components. Features of these components may be substantially similar to those described with respect to the UEs, network nodes, and/or hosts, such that the descriptions thereof are generally applicable to the corresponding components of the core network node 1408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1416 may be under the ownership or control of a service provider other than an operator or provider of the access network 1404 and/or the telecommunication network 1402, and may be operated by the service provider or on behalf of the service provider. The host 1416 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1400 of FIG. 14 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1402 is a cellular network that implements 3GPP standardized features. Accordingly, the telecommunications network 1402 may support network slicing to provide different logical networks to different devices that are connected to the telecommunication network 1402. For example, the telecommunications network 1402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1412 are configured to transmit and/or receive information without direct human interaction. For instance, a UE may be designed to transmit information to the access network 1404 on a predetermined schedule, when triggered by an internal or external event, or in response to requests from the access network 1404. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1414 communicates with the access network 1404 to facilitate indirect communication between one or more UEs (e.g., UE 1412c and/or 1412d) and network nodes (e.g., network node 1410b). In some examples, the hub 1414 may be a controller, router, content source and analytics, or any of the other communication devices described herein regarding UEs. For example, the hub 1414 may be a broadband router enabling access to the core network 1406 for the UEs. As another example, the hub 1414 may be a controller that sends commands or instructions to one or more actuators in the UEs. Commands or instructions may be received from the UEs, network nodes

1410, or by executable code, script, process, or other instructions in the hub 1414. As another example, the hub 1414 may be a data collector that acts as temporary storage for UE data and, in some embodiments, may perform analysis or other processing of the data. As another example, the hub 1414 may be a content source. For example, for a UE that is a VR headset, display, loudspeaker or other media delivery device, the hub 1414 may retrieve VR assets, video, audio, or other media or data related to sensory information via a network node, which the hub 1414 then provides to the UE either directly, after performing local processing, and/or after adding additional local content. In still another example, the hub 1414 acts as a proxy server or orchestrator for the UEs, in particular in if one or more of the UEs are low energy IoT devices.

The hub 1414 may have a constant/persistent or intermittent connection to the network node 1410b. The hub 1414 may also allow for a different communication scheme and/or schedule between the hub 1414 and UEs (e.g., UE 1412c and/or 1412d), and between the hub 1414 and the core network 1406. In other examples, the hub 1414 is connected to the core network 1406 and/or one or more UEs via a wired connection. Moreover, the hub 1414 may be configured to connect to an M2M service provider over the access network 1404 and/or to another UE over a direct connection. In some scenarios, UEs may establish a wireless connection with the network nodes 1410 while still connected via the hub 1414 via a wired or wireless connection. In some embodiments, the hub 1414 may be a dedicated hub—that is, a hub whose primary function is to route communications to/from the UEs from/to the network node 1410b. In other embodiments, the hub 1414 may be a non-dedicated hub—that is, a device which is capable of operating to route communications between the UEs and network node 1410b, but which is additionally capable of operating as a communication start and/or end point for certain data channels.

In various embodiments, host 1416 or core network node 1408 can implement an application function (AF) or and an application server (AS) associated with the communication system or network 1400. In other words, the AF or AS may be located in the core network 1406 or coupled to the core network 1406. Such an AF or AS can be configured to perform operations corresponding to certain exemplary methods described above. Additionally, UE 1412 can be configured to perform operations described above as being performed by 5GMS clients (uplink or downlink) and 5GMS Aware Applications (AA).

FIG. 15 shows a UE 1500 in accordance with some embodiments. The UEs 1412a and 1412b discussed in connection with FIG. 14 can implement the functionality of the UEs 1500 discussed in connection with FIG. 3 to 9 and can correspond to the UE 1500 discussed here in connection with FIG. 15. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1500 includes processing circuitry 1502 that is operatively coupled via a bus 1504 to an input/output interface 1506, a power source 1508, a memory 1510, a communication interface 1512, and/or any other component, or any combination thereof. Certain UEs may utilize all or a subset of the components shown in FIG. 15. The level of integration between the components may vary from one UE to another UE. Further, certain UEs may contain multiple instances of a component, such as multiple processors, memories, transceivers, transmitters, receivers, etc.

The processing circuitry 1502 is configured to process instructions and data and may be configured to implement any sequential state machine operative to execute instructions stored as machine-readable computer programs in the memory 1510. The processing circuitry 1502 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1502 may include multiple central processing units (CPUs).

In the example, the input/output interface 1506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1508 is structured as a battery or battery pack. Other types of power sources, such as an external power source (e.g., an electricity outlet), photovoltaic device, or power cell, may be used. The power source 1508 may further include power circuitry for delivering power from the power source 1508 itself, and/or an external power source, to the various parts of the UE 1500 via input circuitry or an interface such as an electrical power cable. Delivering power may be, for example, for charging of the power source 1508. Power circuitry may perform any formatting, converting, or other modification to the power from the power source 1508 to make the power suitable for the respective components of the UE 1500 to which power is supplied.

The memory 1510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1510 includes one or more application programs 1514, such as an operating system, web browser application, a widget, gadget engine, or other application, and corresponding data 1516. The memory 1510 may store, for use by the UE 1500, any of a variety of various operating systems or combinations of operating systems.

The memory 1510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1510 may allow the UE 1500 to access instructions, application programs and the like, stored on transitory or non-transitory memory media, to off-load data, or to upload data. An article of manufacture, such as one utilizing a communication system may be tangibly embodied as or in the memory 1510, which may be or comprise a device-readable storage medium.

The processing circuitry 1502 may be configured to communicate with an access network or other network using the communication interface 1512. The communication interface 1512 may comprise one or more communication subsystems and may include or be communicatively coupled to an antenna 1522. The communication interface 1512 may include one or more transceivers used to communicate, such as by communicating with one or more remote transceivers of another device capable of wireless communication (e.g., another UE or a network node in an access network). Each transceiver may include a transmitter 1518 and/or a receiver 1520 appropriate to provide network communications (e.g., optical, electrical, frequency allocations, and so forth). Moreover, the transmitter 1518 and receiver 1520 may be coupled to one or more antennas (e.g., antenna 1522) and may share circuit components, software or firmware, or alternatively be implemented separately.

In the illustrated embodiment, communication functions of the communication interface 1512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1512, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1500 shown in FIG. 15.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

In various embodiments, UE 1500 can be configured to perform operations described above as being performed by 5GMS clients (uplink or downlink) and 5GMS Aware Applications (AA). The UE 1500 can especially implement the functionality of the UE discussed in connection with FIG. 3 to 9.

FIG. 16 shows a network node 1600 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1600 includes a processing circuitry 1602, a memory 1604, a communication interface 1606, and a power source 1608. The network node 1600 may be composed of multiple physically separate components (e.g., a NodeB component and a RNC component, or a BTS component and a BSC component, etc.), which may each have their own respective components. In certain scenarios in which the network node 1600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1600 may be configured to support multiple radio access technologies (RATs). In such embodiments, some components may be duplicated (e.g., separate memory 1604 for different RATs) and some components may be reused (e.g., a same antenna 1610 may be shared by different RATs). The network node 1600 may also include multiple sets of the various illustrated components for different wireless technologies integrated into network node 1600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1600.

The processing circuitry 1602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1600 components, such as the memory 1604, to provide network node 1600 functionality.

In some embodiments, the processing circuitry 1602 includes a system on a chip (SOC). In some embodiments, the processing circuitry 1602 includes one or more of radio frequency (RF) transceiver circuitry 1612 and baseband processing circuitry 1614. In some embodiments, the radio frequency (RF) transceiver circuitry 1612 and the baseband processing circuitry 1614 may be on separate chips (or sets of chips), boards, or units, such as radio units and digital units. In alternative embodiments, part or all of RF transceiver circuitry 1612 and baseband processing circuitry 1614 may be on the same chip or set of chips, boards, or units.

The memory 1604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1602. The memory 1604 may store any suitable instructions, data, or information, including a computer program, software, an application including one or more of logic, rules, code, tables, and/or other instructions capable of being executed by the processing circuitry 1602 and utilized by the network node 1600. The memory 1604 may be used to store any calculations made by the processing circuitry 1602 and/or any data received via the communication interface 1606. In some embodiments, the processing circuitry 1602 and memory 1604 is integrated.

The communication interface 1606 is used in wired or wireless communication of signaling and/or data between a network node, access network, and/or UE. As illustrated, the communication interface 1606 comprises port(s)/terminal(s) 1616 to send and receive data, for example to and from a network over a wired connection. The communication interface 1606 also includes radio front-end circuitry 1618 that may be coupled to, or in certain embodiments a part of, the antenna 1610. Radio front-end circuitry 1618 comprises filters 1620 and amplifiers 1622. The radio front-end circuitry 1618 may be connected to an antenna 1610 and processing circuitry 1602. The radio front-end circuitry may be configured to condition signals communicated between antenna 1610 and processing circuitry 1602. The radio front-end circuitry 1618 may receive digital data that is to be sent out to other network nodes or UEs via a wireless connection. The radio front-end circuitry 1618 may convert the digital data into a radio signal having the appropriate channel and bandwidth parameters using a combination of filters 1620 and/or amplifiers 1622. The radio signal may then be transmitted via the antenna 1610. Similarly, when receiving data, the antenna 1610 may collect radio signals which are then converted into digital data by the radio front-end circuitry 1618. The digital data may be passed to the processing circuitry 1602. In other embodiments, the communication interface may comprise different components and/or different combinations of components.

In certain alternative embodiments, the network node 1600 does not include separate radio front-end circuitry 1618, instead, the processing circuitry 1602 includes radio front-end circuitry and is connected to the antenna 1610. Similarly, in some embodiments, all or some of the RF transceiver circuitry 1612 is part of the communication interface 1606. In still other embodiments, the communication interface 1606 includes one or more ports or terminals 1616, the radio front-end circuitry 1618, and the RF transceiver circuitry 1612, as part of a radio unit (not shown), and the communication interface 1606 communicates with the baseband processing circuitry 1614, which is part of a digital unit (not shown).

The antenna 1610 may include one or more antennas, or antenna arrays, configured to send and/or receive wireless signals. The antenna 1610 may be coupled to the radio front-end circuitry 1618 and may be any type of antenna capable of transmitting and receiving data and/or signals wirelessly. In certain embodiments, the antenna 1610 is separate from the network node 1600 and connectable to the network node 1600 through an interface or port.

The antenna 1610, communication interface 1606, and/or the processing circuitry 1602 may be configured to perform any receiving operations and/or certain obtaining operations described herein as being performed by the network node. Any information, data and/or signals may be received from a UE, another network node and/or any other network equipment. Similarly, the antenna 1610, the communication interface 1606, and/or the processing circuitry 1602 may be configured to perform any transmitting operations described herein as being performed by the network node. Any information, data and/or signals may be transmitted to a UE, another network node and/or any other network equipment.

The power source 1608 provides power to the various components of network node 1600 in a form suitable for the respective components (e.g., at a voltage and current level needed for each respective component). The power source 1608 may further comprise, or be coupled to, power management circuitry to supply the components of the network node 1600 with power for performing the functionality described herein. For example, the network node 1600 may be connectable to an external power source (e.g., the power grid, an electricity outlet) via an input circuitry or interface such as an electrical cable, whereby the external power source supplies power to power circuitry of the power source 1608. As a further example, the power source 1608 may comprise a source of power in the form of a battery or battery pack which is connected to, or integrated in, power circuitry. The battery may provide backup power should the external power source fail.

Embodiments of the network node 1600 may include additional components beyond those shown in FIG. 16 for providing certain aspects of the network node's functionality, including any of the functionality described herein and/or any functionality necessary to support the subject matter described herein. For example, the network node 1600 may include user interface equipment to allow input of information into the network node 1600 and to allow output of information from the network node 1600. This may allow a user to perform diagnostic, maintenance, repair, and other administrative functions for the network node 1600.

In various embodiments, network node 1600 can be configured to perform operations performed by network nodes, network functions (NF), application functions (AF), and application servers (AS) in exemplary methods or procedures described above.

FIG. 17 is a block diagram of a host 1700, which may be an embodiment of the host 1416 of FIG. 14, in accordance with various aspects described herein. As used herein, the host 1700 may be or comprise various combinations hardware and/or software, including a standalone server, a blade server, a cloud-implemented server, a distributed server, a virtual machine, container, or processing resources in a server farm. The host 1700 may provide one or more services to one or more UEs.

The host 1700 includes processing circuitry 1702 that is operatively coupled via a bus 1704 to an input/output interface 1706, a network interface 1708, a power source 1710, and a memory 1712. Other components may be included in other embodiments. Features of these components may be substantially similar to those described with respect to the devices of previous figures, such as FIGS. 15 and 16, such that the descriptions thereof are generally applicable to the corresponding components of host 1700.

The memory 1712 may include one or more computer programs including one or more host application programs 1714 and data 1716, which may include user data, e.g., data generated by a UE for the host 1700 or data generated by the host 1700 for a UE. Embodiments of the host 1700 may utilize only a subset or all of the components shown. The host application programs 1714 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1714 may also provide for user authentication and licensing checks and may periodically report health, routes, and content availability to a central node, such as a device in or on the edge of a core network. Accordingly, the host 1700 may select and/or indicate a different host for over-the-top services for a UE. The host application programs 1714 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

In various embodiments, host 1700 can implement an application function (AF) or and an application server (AS) associated with a communication system or network. Such an AF or AS can be configured to perform operations corresponding to certain exemplary methods described above.

FIG. 18 is a block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1800 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1802 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1804 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1806 (also referred to as hypervisors or virtual machine monitors (VMMs)), provide VMs 1808*a* and 1808*b* (one or more of which may be generally referred to as VMs 1808), and/or perform any of the functions, features and/or benefits described in relation with some embodiments described herein. The virtualization layer 1806 may present a virtual operating platform that appears like networking hardware to the VMs 1808.

The VMs 1808 comprise virtual processing, virtual memory, virtual networking or interface and virtual storage, and may be run by a corresponding virtualization layer 1806. Different embodiments of the instance of a virtual appliance 1802 may be implemented on one or more of VMs 1808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1808 may be a software implementation of a physical machine that runs programs as if they were executing on a physical, non-virtualized machine. Each of the VMs 1808, and that part of hardware 1804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1808 on top of the hardware 1804 and corresponds to the application 1802.

Hardware 1804 may be implemented in a standalone network node with generic or specific components. Hardware 1804 may implement some functions via virtualization. Alternatively, hardware 1804 may be part of a larger cluster of hardware (e.g., such as in a data center or CPE) where many hardware nodes work together and are managed via management and orchestration 1810, which, among others, oversees lifecycle management of applications 1802. In some embodiments, hardware 1804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1812 which may alternatively be used for communication between hardware nodes and radio units.

In various embodiments, virtualization environment 1800 can be configured to host various network functions (NFs), application functions (AFs), and application servers (ASs) described above. In other words, these NFs, AFs, and ASs can be implemented in respective virtual nodes 1802 based on underlying hardware 1804. These respective virtual nodes 1802 can be configured to perform various exemplary methods or procedures described above.

FIG. 19 shows a communication diagram of a host 1902 communicating via a network node 1904 with a UE 1906 over a partially wireless connection in accordance with some embodiments. Example implementations, in accordance with various embodiments, of the UE (such as a UE 1412a of FIG. 14 and/or UE 1500 of FIG. 15), network node (such as network node 1410a of FIG. 14 and/or network node 1600 of FIG. 16), and host (such as host 1416 of FIG. 14 and/or host 1700 of FIG. 17) discussed in the preceding paragraphs will now be described with reference to FIG. 19.

Like host 1700, embodiments of host 1902 include hardware, such as a communication interface, processing circuitry, and memory. The host 1902 also includes software, which is stored in or accessible by the host 1902 and executable by the processing circuitry. The software includes a host application that may be operable to provide a service to a remote user, such as the UE 1906 connecting via an over-the-top (OTT) connection 1950 extending between the UE 1906 and host 1902. In providing the service to the remote user, a host application may provide user data which is transmitted using the OTT connection 1950.

The network node 1904 includes hardware enabling it to communicate with the host 1902 and UE 1906. The connection 1960 may be direct or pass through a core network (like core network 1406 of FIG. 14) and/or one or more other intermediate networks, such as one or more public, private, or hosted networks. For example, an intermediate network may be a backbone network or the Internet.

The UE 1906 includes hardware and software, which is stored in or accessible by UE 1906 and executable by the UE's processing circuitry. The software includes a client application, such as a web browser or operator-specific "app" that may be operable to provide a service to a human or non-human user via UE 1906 with the support of the host 1902. In the host 1902, an executing host application may communicate with the executing client application via the OTT connection 1950 terminating at the UE 1906 and host 1902. In providing the service to the user, the UE's client application may receive request data from the host's host application and provide user data in response to the request data. The OTT connection 1950 may transfer both the request data and the user data. The UE's client application may interact with the user to generate the user data that it provides to the host application through the OTT connection 1950.

The OTT connection 1950 may extend via a connection 1960 between the host 1902 and the network node 1904 and via a wireless connection 1970 between the network node 1904 and the UE 1906 to provide the connection between the host 1902 and the UE 1906. The connection 1960 and wireless connection 1970, over which the OTT connection 1950 may be provided, have been drawn abstractly to illustrate the communication between the host 1902 and the UE 1906 via the network node 1904, without explicit reference to any intermediary devices and the precise routing of messages via these devices.

As an example of transmitting data via the OTT connection 1950, in step 1908, the host 1902 provides user data, which may be performed by executing a host application. In some embodiments, the user data is associated with a particular human user interacting with the UE 1906. In other embodiments, the user data is associated with a UE 1906 that shares data with the host 1902 without explicit human interaction. In step 1910, the host 1902 initiates a transmission carrying the user data towards the UE 1906. The host 1902 may initiate the transmission responsive to a request transmitted by the UE 1906. The request may be caused by human interaction with the UE 1906 or by operation of the client application executing on the UE 1906. The transmission may pass via the network node 1904, in accordance with the teachings of the embodiments described throughout this disclosure. Accordingly, in step 1912, the network node 1904 transmits to the UE 1906 the user data that was carried in the transmission that the host 1902 initiated, in accordance with the teachings of the embodiments described throughout this disclosure. In step 1914, the UE 1906 receives the user data carried in the transmission, which may be performed by a client application executed on the UE 1906 associated with the host application executed by the host 1902.

In some examples, the UE 1906 executes a client application which provides user data to the host 1902. The user data may be provided in reaction or response to the data received from the host 1902. Accordingly, in step 1916, the UE 1906 may provide user data, which may be performed by executing the client application. In providing the user data, the client application may further consider user input received from the user via an input/output interface of the UE 1906. Regardless of the specific manner in which the user data was provided, the UE 1906 initiates, in step 1918, transmission of the user data towards the host 1902 via the network node 1904. In step 1920, in accordance with the teachings of the embodiments described throughout this disclosure, the network node 1904 receives user data from the UE 1906 and initiates transmission of the received user data towards the host 1902. In step 1922, the host 1902 receives the user data carried in the transmission initiated by the UE 1906.

One or more of the various embodiments improve the performance of OTT services provided to the UE 1906 using the OTT connection 1950, in which the wireless connection 1970 forms the last segment. More precisely, embodiments can facilitate authentication and/or authorization of UE applications that attempt to invoke dynamic policies related to usage of resources in a communication network, such as a quality of service (QoS) policy or a charging-related policy. Thus, embodiments facilitate enforcement of service level agreements (SLAs) between a network operation (e.g., MNO) and an application service provider (ASP), such that the ASP authorizes application resource usage within bounds of the SLA and prevents resource usage outside of those bounds. For example, embodiments prevent other applications not covered by the SLA from using network resources paid for by the ASP, which increases the value of the SLA to the ASP. For example, the ASP can be an OTT service provider.

In an example scenario, factory status information may be collected and analyzed by the host 1902. As another example, the host 1902 may process audio and video data which may have been retrieved from a UE for use in creating maps. As another example, the host 1902 may collect and analyze real-time data to assist in controlling vehicle congestion (e.g., controlling traffic lights). As another example, the host 1902 may store surveillance video uploaded by a UE. As another example, the host 1902 may store or control access to media content such as video, audio, VR or AR which it can broadcast, multicast or unicast to UEs. As other examples, the host 1902 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1950 between the host 1902 and UE 1906, in response to variations in the measurement results. The measurement procedure and/or the network functionality for reconfiguring the OTT connection may be implemented in software and hardware of the host 1902 and/or UE 1906. In some embodiments, sensors (not shown) may be deployed in or in association with other devices through which the OTT connection 1950 passes; the sensors may participate in the measurement procedure by supplying values of the monitored quantities exemplified above, or supplying values of other physical quantities from which software may compute or estimate the monitored quantities. The reconfiguring of the OTT connection 1950 may include message format, retransmission settings, preferred routing etc.; the reconfiguring need not directly alter the operation of the network node 1904. Such procedures and functionalities may be known and practiced in the art. In certain embodiments, measurements may involve proprietary UE signaling that facilitates measurements of throughput, propagation times, latency and the like, by the host 1902. The measurements may be implemented in that software causes messages to be transmitted, in particular empty or 'dummy' messages, using the OTT connection 1950 while monitoring propagation times, errors, etc.

From the above discussion, some general conclusions can be drawn.

As far as the 5GMS AA is concerned the following is noted:

In some embodiments, the dynamic policy is a QoS policy. In other embodiments, the dynamic policy is a zero-rating policy. In some embodiments, the token is sent to a media session handler (MSH) of the 5GMS client.

In some embodiments, obtaining the token can include sending a login request to the ASP and receiving a login response from the ASP, with the token being received in the login response. In some of these embodiments, the login request includes a username and password associated with a user of the 5GMS AA and the login response also includes a user identifier (uid) corresponding to the username. In such case, the uid is sent to the 5GMS client together with the token.

In some embodiments, the token is associated with a validity duration and these exemplary methods can also include, in association with expiration of the validity duration, obtaining from the ASP an updated token indicating that the 5GMS AA is authorized to invoke or activate the dynamic policy. In such case, the updated token is associated with an updated validity duration. In some of these embodiments, these exemplary methods can also include sending the updated token to the 5GMS client.

In some embodiments, these exemplary methods can also include transmitting or receiving data, via the communication network in accordance with the dynamic policy, during a media session between the 5GMS AA and the ASP. This can be done, for example, after the dynamic policy has been activated. In some embodiments, the data is received via dynamic adaptive streaming over HTTP (DASH) or HTTP live stream (HLS). Furthermore it is possible that the token is sent to a media session handler, MSH, of the 5 GMS client.

In some embodiments the token is an identifier indicating that the UE is authorized to authorized to invoke or activate the dynamic policy.

As far as the 5GMS client is concerned the following is noted:

In some embodiments, the dynamic policy is a QoS policy. In other embodiments, the dynamic policy is a zero-rating policy. In some embodiments, the token is received from the 5GMS AA and sent to the 5GMS AF by a MSH of the 5GMS client. In some embodiments, the token is received together with a user identifier (uid) corresponding to a username associated with a user of the 5GMS AA, and the uid is sent to the 5GMS AF together with the token.

In some embodiments, the token is associated with a validity duration and these exemplary methods can also include, in association with expiration of the validity duration, receiving from the 5GMS AA an updated token indicating that the 5GMS AA is authorized to invoke or activate the dynamic policy. The updated token is associated with an updated validity duration. In some of these embodiments, these exemplary methods can also include sending the updated token to the 5GMS AF in a request to activate the dynamic policy for the 5GMS AA and receiving, from the 5GMS AF, a response indicating that the dynamic policy is activated for the 5GMS AA in accordance with the updated token.

In some embodiments, these exemplary methods can also include transmitting or receiving data with a 5GMS application server (AS) via the communication network in accordance with the dynamic policy. The data is associated with a media session between the 5GMS AA and the ASP. This can be done, for example, after the dynamic policy has been activated. In some embodiments, the data can be received via HTTP DASH or HLS.

In some embodiments, the token is received from the 5GMS AA and sent to the 5GMS AF by a media session handler, MSH, of the 5GMS client.

As far as the 5GMS AF is concerned, the following is noted;

In some embodiments, the dynamic policy is a QoS policy. In other embodiments, the dynamic policy is a zero-rating policy.

In some embodiments, these exemplary methods can also include receiving, from the ASP, a further token indicating that the 5GMS AA is authorized to invoke or activate the dynamic policy. In such case, determining that the token is valid includes verifying that the token received from the 5GMS AA matches the further token received from the ASP. In some of these embodiments, the further token includes a validity duration and determining that the token is valid also includes verifying that the token is received from the 5GMS AA before expiration of the validity duration.

In some variants, these exemplary methods can also include receiving, from the ASP, an updated further token indicating that the 5GMS is authorized to invoke or activate the dynamic policy. The updated further token is associated with an updated validity duration. In some further variants, these exemplary methods can also include subsequently receiving an updated token from the 5GMS client in a request to activate the dynamic policy for the 5GMS AA and based on determining that the updated token is valid, sending to the 5GMS client a response indicating that the dynamic policy is activated. The updated token is associated with the updated validity duration.

In other embodiments, determining that the token is valid includes sending the token to the ASP and receiving from the ASP a response indicating that the 5GMS AA is authorized to activate the dynamic policy. In some of these embodiments, the token is received from the 5GMS client together with a user identifier (uid) corresponding to a username associated with a user of the 5GMS AA and the token is sent to the ASP together with the uid.

In some embodiments, these exemplary methods can also include, based on determining that the token is valid, sending to a PCF of the communication network a request to activate the dynamic policy and receiving from the PCF a response indicating that the dynamic policy is activated. The response is sent to the 5GMS client based on the response from the PCF.

As far as the APS is concerned, the following is noted:

In some embodiments, the dynamic policy is a QoS policy. In other embodiments, the dynamic policy is a zero-rating policy.

In some embodiments, providing the token can include receiving a login request from the 5GMS AA and sending a login response to the 5GMS AA, with the token being sent in the login response. In some of these embodiments, the login request includes a username and password associated with a user of the 5GMS AA, the login response also includes a user identifier (uid) corresponding to the username, and the uid is sent to the 5GMS client together with the token.

In some embodiments, the token is associated with a validity duration and these exemplary methods can also include, in association with expiration of the validity duration, providing to the 5GMS AA an updated token indicating that the 5GMS AA is authorized to invoke or activate the dynamic policy. The updated token is associated with an updated validity duration.

In some embodiments, these exemplary methods can also include the following: receiving, from a 5GMS AF associated with the communication network, a further token indicating that the 5GMS AA is authorized to invoke or activate the dynamic policy sending the token to the ASP; verifying that the further token received from the 5GMS AF matches the token provided to the 5GMS AA; and sending to the 5GMS AF a response indicating that the 5GMS AA is authorized to activate the dynamic policy. In some of these embodiments, the token is associated with a validity duration and these exemplary methods can also include verifying that the further token is received from the 5GMS AF before expiration of the validity duration.

In other embodiments, these exemplary methods can also include sending the token to a 5GMS AF associated with the communication network. In some of these embodiments, the token is associated with a validity duration and these exemplary methods can also include, in association with expiration of the validity duration, sending to the 5GMS AF an updated token indicating that the 5GMS is authorized to invoke or activate the dynamic policy. The updated token is associated with an updated validity duration.

In some embodiments, these exemplary methods can also include transmitting or receiving data, via the communication network in accordance with the dynamic policy, during a media session between the 5GMS AA and the ASP. This can be done, for example, after the dynamic policy has been activated. In some embodiments, the data can be transmitted via HTTP DASH or HLS.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Examples of the techniques and apparatus described herein include, but are not limited to, the following enumerated embodiments:

A1. A method for a 5G Media Streaming (5GMS) Aware Application (AA) hosted by a user equipment (UE) operating in a communication network, the method comprising:
obtaining, from an application service provider (ASP) associated with the 5GMS AA, a token indicating that the 5GMS AA is authorized to invoke or activate a dynamic policy for resources of the communication network,
wherein the dynamic policy is associated with the ASP; and sending the token to a 5GMS client hosted by the UE, wherein the 5GMS client is associated with a 5GMS application function (AF) of the communication network.

A2. The method of embodiment A1, wherein the dynamic policy is one of the following: a quality-of-service (QoS) policy, or a zero-rating policy.

A3. The method of any of embodiments A1-A2, wherein obtaining the token comprises sending a login request to the ASP and receiving a login response from the ASP, and wherein the token is received in the login response.

A4. The method of embodiment A3, wherein:
the login request includes a username and password associated with a user of the 5GMS AA;
the login response also includes a user identifier (uid) corresponding to the username; and
the uid is sent to the 5GMS client together with the token.

A5. The method of any of embodiments A1-A4, wherein:
the token is associated with a validity duration;
the method further comprises, in association with expiration of the validity duration, obtaining from the ASP an updated token indicating that the 5GMS AA is authorized to invoke or activate the dynamic policy; and
the updated token is associated with an updated validity duration.

A6. The method of embodiment A5, further comprising sending the updated token to the 5GMS client.

A7. The method of any of embodiments A1-A6, further comprising transmitting or receiving data, via the communication network in accordance with the dynamic policy, during a media session between the 5GMS AA and the ASP.

A8. The method of embodiment A7, wherein the data is received via dynamic adaptive streaming over HTTP (DASH) or HTTP live stream (HLS).

A9. The method of any of embodiments A1-A8, wherein the token is sent to a media session handler (MSH) of the 5GMS client.

B1. A method for a 5G Media Streaming (5GMS) client hosted by a user equipment (UE) operating in a communication network, the method comprising:
receiving, from a 5G Media Streaming (5GMS) Aware Application (AA) hosted by the UE, a token indicating that the 5GMS AA is authorized to invoke or activate a dynamic policy for resources of the communication network, wherein the dynamic policy is associated with an application service provider (ASP) associated with the 5GMS AA;
sending the token to a 5GMS application function (AF) of the communication network in a request to activate the dynamic policy for the 5GMS AA; and
receiving, from the 5GMS AF, a response indicating that the dynamic policy is activated for the 5GMS AA in accordance with the token.

B2. The method of embodiment B1, wherein the dynamic policy is one of the following: a quality-of-service (QoS) policy, or a zero-rating policy.

B3. The method of any of embodiments B1-B2, wherein:
the token is received together with user identifier (uid) corresponding to a username associated with a user of the 5GMS AA; and
the uid is sent to the 5GMS AF together with the token.

B4. The method of any of embodiments B1-B3, wherein:
the token is associated with a validity duration;
the method further comprises, in association with expiration of the validity duration, receiving from the 5GMS AA an updated token indicating that the 5GMS AA is authorized to invoke or activate the dynamic policy; and
the updated token is associated with an updated validity duration.

B5. The method of embodiment B4, further comprising:
sending the updated token to the 5GMS AF in a request to activate the dynamic policy for the 5GMS AA; and
receiving, from the 5GMS AF, a response indicating that the dynamic policy is activated for the 5GMS AA in accordance with the updated token.

B6. The method of any of embodiments B1-B5, further comprising transmitting or receiving data with a 5GMS application server (AS) via the communication network in accordance with the dynamic policy, wherein the data is associated with a media session between the 5GMS AA and the ASP.

B7. The method of embodiment B6, wherein the data is received via dynamic adaptive streaming over HTTP (DASH) or HTTP live stream (HLS).

B8. The method of any of embodiments B1-B7, wherein the token is received from the 5GMS AA and sent to the 5GMS AF by a media session handler (MSH) of the 5GMS client.

C1. A method for a 5G Media Streaming (5GMS) Application Function (AF) associated with a communication network, the method comprising:

receiving, from a 5GMS client hosted by a user equipment (UE) operating in the communication network, a token indicating that a 5GMS Aware Application (AA) hosted by the UE is authorized to invoke or activate a dynamic policy for resources of the communication network, wherein:

the dynamic policy is associated with an application service provider (ASP) associated with the 5GMS AA, and the token is received in a request to activate the dynamic policy for the 5GMS AA; and based on determining that the token is valid, sending to the 5GMS client a response indicating that the dynamic policy is activated.

C2. The method of embodiment C1, wherein the dynamic policy is one of the following: a quality-of-service (QoS) policy, or a zero-rating policy.

C3. The method of any of embodiments C1-C2, wherein:

the method further comprises receiving, from the ASP, a further token indicating that the 5GMS AA is authorized to invoke or activate the dynamic policy;

determining that the token is valid comprises verifying that the token received from the 5GMS AA matches the further token received from the ASP.

C4. The method of embodiment C3, wherein:

the further token is associate with a validity duration; and determining that the token is valid comprises verifying that the token is received from the 5GMS AA before expiration of the validity duration.

C5. The method of embodiment C4, further comprising receiving, from the ASP, an updated further token indicating that the 5GMS is authorized to invoke or activate the dynamic policy, wherein the updated further token is associated with an updated validity duration.

C6. The method of embodiment C5, further comprising:

subsequently receiving an updated token from the 5GMS client in a request to activate the dynamic policy for the 5GMS AA, wherein the updated token is associated with the updated validity duration; and based on determining that the updated token is valid, sending to the 5GMS client a response indicating that the dynamic policy is activated.

C7. The method of any of embodiments C1-C2, wherein determining that the token is valid comprises:

sending the token to the ASP; and receiving from the ASP a response indicating that the 5GMS AA is authorized to activate the dynamic policy.

C8. The method of embodiment C7, wherein:

the token is received from the 5GMS client together with a user identifier (uid) corresponding to a username associated with a user of the 5GMS AA; and the token is sent to the ASP together with the uid.

C9. The method of any of embodiments C1-C8, further comprising:

based on determining that the token is valid, sending to a policy control function (PCF) of the communication network, a request to activate the dynamic policy; and receiving from the PCF a response indicating that the dynamic policy is activated, wherein the response is sent to the 5GMS client based on the response from the PCF.

D1. A method for an application service provider (ASP) for a 5G Media Streaming (5GMS) Aware Application (AA) hosted by a user equipment (UE) operating in a communication network, the method comprising:

providing, to the 5GMS AA, a token indicating that the 5GMS AA is authorized to invoke or activate a dynamic policy for resources of the communication network, wherein the dynamic policy is associated with the ASP.

D2. The method of embodiment D1, wherein the dynamic policy is one of the following: a quality-of-service (QoS) policy, or a zero-rating policy.

D3. The method of any of embodiments D1-D2, wherein providing the token comprises receiving a login request from the 5GMS AA and sending a login response to the 5GMS AA, and wherein the token is sent in the login response.

D4. The method of embodiment D3, wherein:

the login request includes a username and password associated with a user of the 5GMS AA;

the login response also includes a user identifier (uid) corresponding to the username; and the uid is sent to the 5GMS client together with the token.

D5. The method of any of embodiments D1-D4, wherein:

the token is associated with a validity duration;

the method further comprises, in association with expiration of the validity duration, providing to the 5GMS AA an updated token indicating that the 5GMS AA is authorized to invoke or activate the dynamic policy; and the updated token is associated with an updated validity duration.

D6. The method of any of embodiments D1-D5, further comprising:

receiving, from a 5GMS Application Function (AF) associated with the communication network, a further token indicating that the 5GMS AA is authorized to invoke or activate the dynamic policy sending the token to the ASP;

verifying that the further token received from the 5GMS AF matches the token provided to the 5GMS AA; and sending to the 5GMS AF a response indicating that the 5GMS AA is authorized to activate the dynamic policy.

D7. The method of embodiment D6, wherein:

the token is associated with a validity duration;

the method further comprises verifying that the further token is received from the 5GMS AF before expiration of the validity duration.

D8. The method of any of embodiments D1-D5, further comprising sending the token to a 5GMS Application Function (AF) associated with the communication network.

D9. The method of embodiment D8, wherein:

the token is associated with a validity duration; and the method further comprises, in association with expiration of the validity duration, sending to the 5GMS AF an updated token indicating that the 5GMS is authorized to invoke or activate the dynamic policy, wherein the updated token is associated with an updated validity duration.

D10. The method of any of embodiments D1-D9, further comprising transmitting or receiving data, via the communication network in accordance with the dynamic policy, during a media session between the 5GMS AA and the ASP.

D11. The method of embodiment D10, wherein the data is transmitted via dynamic adaptive streaming over HTTP (DASH) or HTTP live stream (HLS).

E1. A user equipment (UE) configured to operate in a communication network, wherein:
the UE comprises communication interface circuitry and processing circuitry that are operably coupled and configured to implement a 5G Media Streaming (5GMS) Aware Application (AA); and
the processing circuitry and interface circuitry are further configured to perform operations corresponding to any of the methods of embodiments A1-A9.

E2. A user equipment (UE) configured to operate in a communication network, the UE being further configured to host a 5G Media Streaming (5GMS) Aware Application (AA) that is arranged to perform operations corresponding to any of the methods of embodiments A1-A9.

E3. A non-transitory, computer-readable medium storing computer-executable instructions that, when executed by processing circuitry of a user equipment (UE) configured to host a 5G Media Streaming (5GMS) Aware Application (AA), configure the 5GMS AA to perform operations corresponding to any of the methods of embodiments A1-A9.

E4. A computer program product comprising computer-executable instructions that, when executed by processing circuitry of a user equipment (UE) configured to host a 5G Media Streaming (5GMS) Aware Application (AA), configure the 5GMS AA to perform operations corresponding to any of the methods of embodiments A1-A9.

F1. A user equipment (UE) configured to operate in a communication network, wherein:
the UE comprises communication interface circuitry and processing circuitry that are operably coupled and configured to implement a 5G Media Streaming (5GMS) client; and
the processing circuitry and interface circuitry are further configured to perform operations corresponding to any of the methods of embodiments B1-B8.

F2. A user equipment (UE) configured to operate in a communication network, the UE being further configured to host a 5G Media Streaming (5GMS) client that is arranged to perform operations corresponding to any of the methods of embodiments B1-B8.

F3. A non-transitory, computer-readable medium storing computer-executable instructions that, when executed by processing circuitry of a user equipment (UE) configured to host a 5G Media Streaming (5GMS) client, configure the 5GMS client to perform operations corresponding to any of the methods of embodiments B1-B8.

F4. A computer program product comprising computer-executable instructions that, when executed by processing circuitry of a user equipment (UE) configured to host a 5G Media Streaming (5GMS) client, configure the 5GMS client to perform operations corresponding to any of the methods of embodiments B1-B8.

G1. A Media Streaming (5GMS) Application Function (AF) associated with a communication network, wherein:
the 5GMS AF is implemented by processing circuitry and communication interface circuitry that are operably coupled; and
the processing circuitry and the communication interface circuitry are configured to perform operations corresponding to any of the method of embodiments C1-C9.

G2. A Media Streaming (5GMS) Application Function (AF) associated with a communication network, wherein the 5GMS AF is configured to perform operations corresponding to any of the method of embodiments C1-C9.

G3. A non-transitory, computer-readable medium storing computer-executable instructions that, when executed by processing circuitry associated with a 5G Media Streaming (5GMS) Application Function (AF) that is associated with a communication network, configure the 5GMS AF to perform operations corresponding to any of the methods of embodiments C1-C9.

G4. A computer program product comprising computer-executable instructions that, when executed by processing circuitry associated with a 5G Media Streaming (5GMS) Application Function (AF) that is associated with a communication network, configure the 5GMS AF to perform operations corresponding to any of the methods of embodiments C1-C9.

H1. An application service provider (ASP) for a 5G Media Streaming (5GMS) Aware Application (AA) hosted by a user equipment (UE) operating in a communication network, wherein:
the ASP is implemented by processing circuitry and communication interface circuitry that are operably coupled; and
the processing circuitry and the communication interface circuitry are configured to perform operations corresponding to any of the method of embodiments D1-D11.

H2. An application service provider (ASP) for a 5G Media Streaming (5GMS) Aware Application (AA) hosted by a user equipment (UE) operating in a communication network, wherein the ASP is configured to perform operations corresponding to any of the method of embodiments D1-D11.

H3. A non-transitory, computer-readable medium storing computer-executable instructions that, when executed by processing circuitry associated with an application service provider (ASP) for a 5G Media Streaming (5GMS) Aware Application (AA) hosted by a user equipment (UE) operating in a communication network, configure the ASP to perform operations corresponding to any of the methods of embodiments D1-D11.

H4. A computer program product comprising computer-executable instructions that, when executed by processing circuitry associated with an application service provider (ASP) for a 5G Media Streaming (5GMS) Aware Application (AA) hosted by a user equipment (UE) operating in a communication network, configure the ASP to perform operations corresponding to any of the methods of embodiments D1-D11.

The invention claimed is:

1. A method performed by a 5G Media Streaming (5GMS) Aware Application (AA) and a 5GMS client that are hosted by a user equipment (UE) configured to operate in a communication network, the method comprising:

obtaining, by the 5GMS AA from an application service provider (ASP) associated with the 5GMS AA, a token indicating that the 5GMS AA is authorized to invoke or activate a dynamic policy for resources of the communication network, wherein the dynamic policy is associated with the ASP; and by the 5GMS AA, sending the token to the 5GMS client, wherein the 5GMS client is associated with a 5GMS application function (AF) of the communication network;

by the 5GMS client, receiving the token from the 5GMS AA and sending the received token to the 5GMS AF in a request to activate the dynamic policy for the 5GMS AA; and receiving, by the 5GMS client from the 5GMS AF, a response indicating that the dynamic policy is activated for the 5GMS AA in accordance with the token.

2. The method of claim 1, wherein the dynamic policy is one of the following: a quality-of-service (QoS) policy, or a zero-rating policy.

3. The method of claim 1, wherein obtaining the token by the 5GMS AA comprises the 5GMS AA sending a login request to the ASP and receiving from the ASP a login response that includes the token.

4. The method of claim 3, wherein:

the login request includes a username and password associated with a user of the 5GMS AA;

the login response also includes a user identifier (uid) corresponding to the username; and the uid is sent by the 5GMS AA to the 5GMS client together with the token.

5. The method of claim 1, wherein:

the token is associated with a validity duration;

the method further comprises, in association with expiration of the validity duration, obtaining by the 5GMS AA from the ASP an updated token indicating that the 5GMS AA is authorized to invoke or activate the dynamic policy; and the updated token is associated with an updated validity duration.

6. The method of claim 1, wherein the token is sent by the 5GMS AA to a media session handler (MSH) of the 5GMS client.

7. The method of claim 1, wherein the token is an identifier indicating that the UE is authorized to invoke or activate the dynamic policy.

8. The method of claim 1, wherein:

the token is sent by the 5GMS AA and received by the 5GMS client together with a user identifier (uid) corresponding to a username associated with a user of the 5GMS AA; and the uid is sent by the 5GMS client to the 5GMS AF in the request together with the received token.

9. The method of claim 1, wherein the token is received from the 5GMS AA and sent to the 5GMS AF by a media session handler (MSH) of the 5GMS client.

10. A method performed by a 5G Media Streaming (5GMS) Application Function (AF) associated with a communication network, the method comprising:

receiving, from a 5GMS client hosted by a user equipment (UE) operating in the communication network, a token indicating that a 5GMS Aware Application (AA) hosted by the UE is authorized to invoke or activate a dynamic policy for resources of the communication network, wherein:

the dynamic policy is associated with an application service provider (ASP) associated with the 5GMS AA; and the token is received in a request to activate the dynamic policy for the 5GMS AA; and based on determining that the token is valid, sending to the 5GMS client a response indicating that the dynamic policy is activated.

11. The method of claim 10, wherein the dynamic policy is one of the following: a quality-of-service (QoS) policy, or a zero-rating policy.

12. The method of claim 10, wherein:

the method further comprises receiving, from the ASP, a further token indicating that the 5GMS AA is authorized to invoke or activate the dynamic policy; and determining that the token is valid comprises verifying that the token received from the 5GMS AA matches the further token received from the ASP.

13. The method of claim 12, wherein:

the further token is associate with a validity duration; and determining that the token is valid comprises verifying that the token is received from the 5GMS AA before expiration of the validity duration.

14. The method of claim 13, further comprising receiving, from the ASP, an updated further token indicating that the 5GMS AA is authorized to invoke or activate the dynamic policy, wherein the updated further token is associated with an updated validity duration.

15. The method of claim 10, wherein determining that the token is valid comprises sending the token to the ASP and receiving from the ASP a response indicating that the 5GMS AA is authorized to activate the dynamic policy.

16. The method of claim 15, wherein:

the token is received from the 5GMS client together with a user identifier (uid) corresponding to a username associated with a user of the 5GMS AA; and the token is sent to the ASP together with the uid.

17. The method of claim 10, further comprising:

based on determining that the token is valid, sending to a policy control function (PCF) of the communication network a request to activate the dynamic policy; and receiving from the PCF a response indicating that the dynamic policy is activated, wherein the response is sent to the 5GMS client based on the response from the PCF.

18. A user equipment (UE) configured to operate in a communication network, wherein the UE comprises:

processing circuitry; and a memory operably coupled to the processing circuitry and comprising executable instructions for a 5G Media Streaming (5GMS) Aware Application (AA) and a 5GMS client, wherein execution of the instructions by the processing circuitry causes:

the 5GMS AA to obtain, from an application service provider (ASP) associated with the 5GMS AA, a token indicating that the 5GMS AA is authorized to invoke or activate a dynamic policy for resources of the communication network, wherein the dynamic policy is associated with the ASP; and the 5GMS AA to send the token to the 5GMS client, wherein the 5GMS client is associated with a 5GMS application function (AF) of the communication network;

the 5GMS client to receive the token from the 5GMS AA and send the received token to the 5GMS AF in a request to activate the dynamic policy for the 5GMS AA; and the 5GMS client to receive, from the 5GMS AF, a response indicating that the dynamic policy is activated for the 5GMS AA in accordance with the token.

19. The UE of claim 18, wherein execution of the instructions causes the 5GMS AA to obtain the token by sending a login request to the ASP and receiving from the ASP a login response that includes the token, wherein:

the login request includes a username and password associated with a user of the 5GMS AA;

the login response also includes a user identifier (uid) corresponding to the username; and the uid is sent by the 5GMS AA to the 5GMS client together with the token.

20. The UE of claim 18, wherein:

the token is sent by the 5GMS AA and received by the 5GMS client together with a user identifier (uid) corresponding to a username associated with a user of the 5GMS AA; and the uid is sent by the 5GMS client to the 5GMS AF in the request together with the received token.

21. The UE of claim 18, wherein the token is received from the 5GMS AA and sent to the 5GMS AF by a media session handler (MSH) of the 5GMS client.

22. A non-transitory, computer-readable medium storing computer-executable instructions that, when executed by processing circuitry of a user equipment (UE) configured to operate in a communication network, configure a 5G Media Streaming (5GMS) Aware Application (AA) and a 5GMS client hosted by the UE to perform the method of claim 1.

23. Network equipment configured to implement a 5G Media Streaming (5GMS) Application Function (AF) associated with a communication network, the network equipment comprising:

communication interface circuitry configured to communicate, via the communication network, with a user equipment (UE) that hosts a 5G Media Streaming (5GMS) Aware Application (AA) and a 5GMS client; and processing circuitry operably coupled to the communication interface circuitry, wherein the processing circuitry and the communication interface circuitry are configured to:

receive, from the 5GMS client, a token indicating that the 5GMS AA is authorized to invoke or activate a dynamic policy for resources of the communication network, wherein:

the dynamic policy is associated with an application service provider (ASP) associated with the 5GMS AA; and the token is received in a request to activate the dynamic policy for the 5GMS AA; and based on a determination that the token is valid, send to the 5GMS client a response indicating that the dynamic policy is activated.

24. The network equipment of claim 23, wherein the processing circuitry and the communication interface circuitry are configured to determine that the token is valid based on one of the following:

receiving from the ASP a further token indicating that the 5GMS AA is authorized to invoke or activate the dynamic policy, and verifying that the token received from the 5GMS AA matches the further token received from the ASP; or sending the token to the ASP and receiving from the ASP a response indicating that the 5GMS AA is authorized to activate the dynamic policy.

25. The network equipment of claim 24, wherein:

the token is received from the 5GMS client together with a user identifier (uid) corresponding to a username associated with a user of the 5GMS AA; and the token is sent to the ASP together with the uid.

26. A non-transitory, computer-readable medium storing computer-executable instructions that, when executed by processing circuitry associated with a 5G Media Streaming (5GMS) Application Function (AF) that is associated with a communication network, configure the 5GMS AF to perform operations corresponding to the method of claim 10.

\* \* \* \* \*